US012761948B1

(12) United States Patent
Neumann et al.

(10) Patent No.: US 12,761,948 B1
(45) Date of Patent: Oct. 13, 2026

(54) AUTOSCALING FOR STREAMING WORKLOADS

(71) Applicant: Databricks, Inc., San Francisco, CA (US)

(72) Inventors: Andreas Neumann, Oakland, CA (US); Kiavash Kianfar, San Francisco, CA (US); Li Zhang, Santa Clara, CA (US); Tathagata Das, New Haven, CT (US)

(73) Assignee: Databricks, Inc., San Francisco, CA (US)

( * ) Notice: Subject to any disclaimer, the term of this patent is extended or adjusted under 35 U.S.C. 154(b) by 907 days.

(21) Appl. No.: 17/728,365

(22) Filed: Apr. 25, 2022

Related U.S. Application Data

(60) Provisional application No. 63/319,659, filed on Mar. 14, 2022.

(51) Int. Cl.
*G06F 9/48* (2006.01)
*G06F 9/50* (2006.01)

(52) U.S. Cl.
CPC .......... *G06F 9/4881* (2013.01); *G06F 9/5083* (2013.01)

(58) Field of Classification Search
CPC ............................. G06F 9/4881; G06F 9/5083
See application file for complete search history.

(56) References Cited

U.S. PATENT DOCUMENTS

2006/0095912 A1 5/2006 Wood-Gaines et al.
2006/0155633 A1 7/2006 Fellenstein et al.
2010/0122065 A1* 5/2010 Dean ................. G06F 16/24532 712/203
2015/0157880 A1* 6/2015 Dalbow ................. G16H 15/00 702/182
2018/0124170 A1 5/2018 Hayashi et al.
2019/0138338 A1 5/2019 Shimogawa
2020/0219028 A1 7/2020 Papaemmanouil et al.
2020/0233706 A1* 7/2020 Smith ................... G06F 9/5066
2020/0396280 A1 12/2020 Norris
2021/0392185 A1* 12/2021 Einkauf .................. H04L 41/22
2022/0092172 A1 3/2022 Tsuchida et al.
2024/0361917 A1* 10/2024 Subramanian ........ G06F 3/0659

(Continued)

OTHER PUBLICATIONS

Osama et al. "Job-queuing and Auto-scaling in Container-based Cloud Environments", 10th International Workshop on Science Gateways (IWSG 2018),, pp. 1-6 (Year: 2018).*

(Continued)

*Primary Examiner* — Aimee Li
*Assistant Examiner* — Willy W Huaracha
(74) *Attorney, Agent, or Firm* — Fenwick & West LLP

(57) ABSTRACT

The present application discloses a method, system, and computer system for automatically scaling task-processing capacity. The method includes obtaining input data from one or more data sources, determining, by a data layer, a set of the input data to process, obtaining a current measure of queued tasks and/or a task-processing capacity, determining a set of tasks to process based at least in part on the set of the input data to process, and automatically scaling the task-processing capacity based at least in part on (i) the current measure of the queued tasks, a measure of the task-processing capacity, and/or a measure of utilization of the task-processing capacity, and (ii) the set of tasks to process.

17 Claims, 12 Drawing Sheets

(56) References Cited

U.S. PATENT DOCUMENTS

2024/0397315 A1* 11/2024 Ogbuachi ........... H04L 63/0272

OTHER PUBLICATIONS

Abdelhamid et al. "Prompt: Dynamic Data-Partitioning for Distributed Micro-batch Stream Processing Systems." Mij 23 (2020): R24, pp. 2455-2469. (Year: 2020).*

United States Office Action, U.S. Appl. No. 17/728,383, dated Sep. 26, 2024 21 pages.

* cited by examiner

400

500

600

800

900

1100

1200

AUTOSCALING FOR STREAMING WORKLOADS

CROSS REFERENCE TO OTHER APPLICATIONS

This application claims priority to U.S. Provisional Patent Application No. 63/319,659 entitled AUTOSCALING FOR STREAMING WORKLOADS filed Mar. 14, 2022 which is incorporated herein by reference for all purposes.

BACKGROUND OF THE INVENTION

A system for big data processing comprises a system for deployments of applications, configurations, one or more datasets, and model(s) used in connection with analyzing the data. Systems generally scale up or scale down resources to process differing amounts of data.

BRIEF DESCRIPTION OF THE DRAWINGS

Various embodiments of the invention are disclosed in the following detailed description and the accompanying drawings.

DETAILED DESCRIPTION

Figure 1:
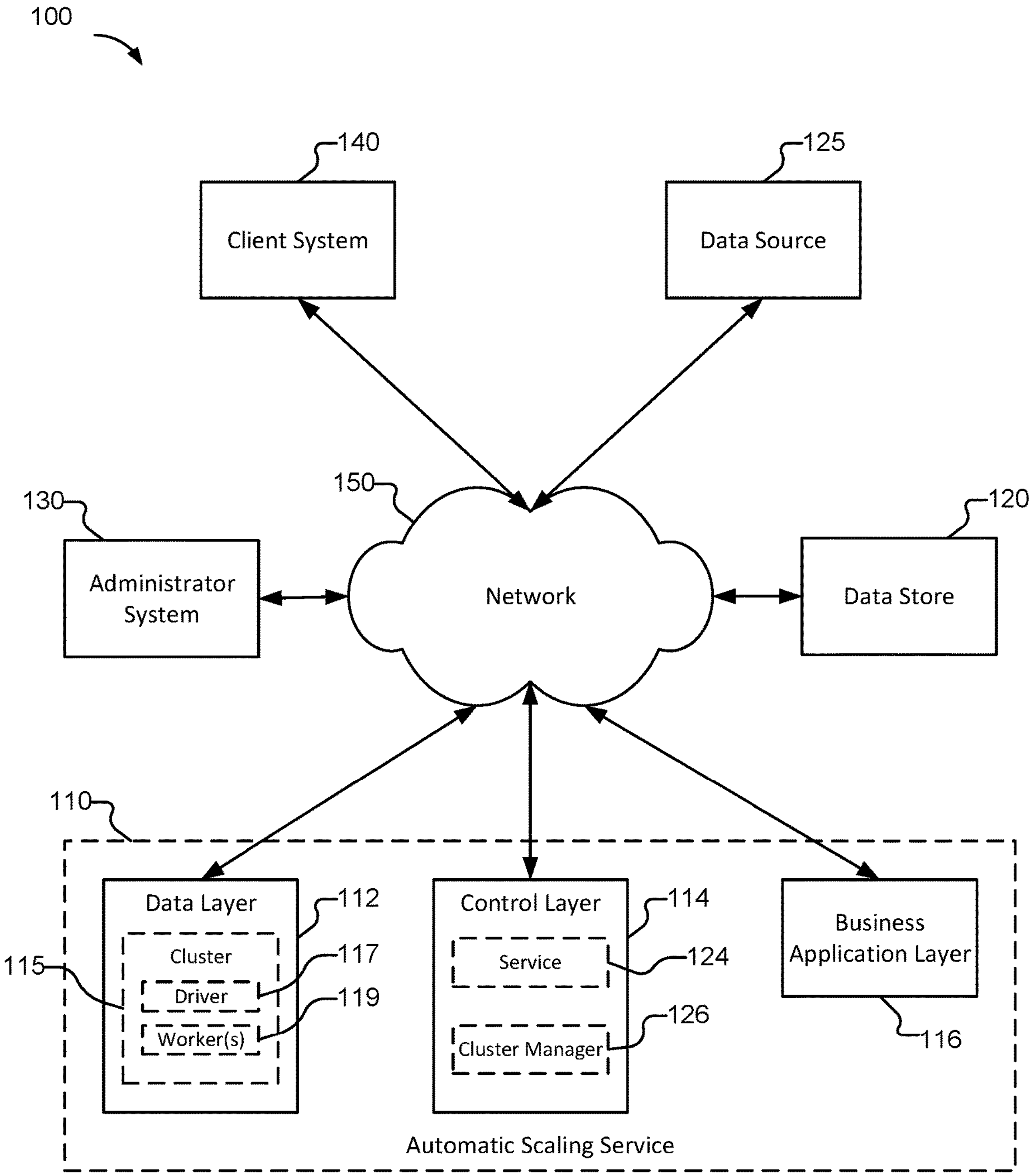
FIG. 1 is a block diagram of a system for automatically scaling task-processing resources according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, streaming data means data that corresponds to an unbounded amount of data arriving over time that is obtained by one or more data sources. For example, streaming data is data that is continuously received over time from the one or more data sources.

As used herein, batched data means data that corresponds to a bounded amount of data that is obtained by one or more data sources, where the data is all available at the same time.

As used herein, a microbatch means a finite set of data such as a subset of streaming data with the chronological order of the finite set of data preserved (e.g., the subset of data that flows in a data stream between time t1 and t2). In some embodiments, the system divides the infinite stream of data into microbatches, where the microbatches are processed one by one in time order. For example, a microbatch is a bounded amount of data obtained from streaming data. The set of data comprised in the microbatch can generally be unprocessed data. As an example, a system obtains a microbatch from one or more data sources. In response to determining that data to be processed is available at a data source(s), the system determines a microbatch of such data, and the microbatch is a subset of the data to be processed is available at a data source(s). A size of the microbatch can be dynamically determined based on one or more of the data source, a reading speed corresponding to the data source, a type of information generated at the data source, a task-processing capacity, a number of tasks queued to be processed, and/or a mapping of number of task to an amount of data (e.g., a ratio of data to tasks expected from a particular data source or for data of a particular data type, etc.). For example, the system dynamically determines the size of a microbatch based on an estimation that the system is able to keep processing tasks and keep up with incoming tasks. The system uses the set of data comprised in the microbatch to determine corresponding tasks to be performed by the system (e.g., by processing resources corresponding to a task slot). In some embodiments, the size of the microbatch is determined based on the amount of data that flows in from the sources while the previous microbatch is processed. Therefore, the size can indirectly be dependent on resources available and the complexity of the processing that is done on the previous microbatch.

According to various embodiments, the size of the microbatch can be determined based at least in part on an efficiency (or expected efficiency) with which the system processes the tasks. For example, if the system determines a size of a microbatch to be relatively small, which thus corresponds to a small number of tasks, a relatively large amount of overhead is incurred to managed and instantiate the task slots to process tasks at small data amounts. Conversely, if the system determines a size of a microbatch to be relatively large, which thus corresponds to a large number of tasks, the processing of the corresponding tasks is relatively inefficient (e.g., too many processing resources are instantiated to process the tasks corresponding to the microbatch, or the task queues become relatively large as the large number of tasks are queued to be process in the current capacity of task slots). Note that the number of tasks and the length of tasks may also influence the size of microbatch-a large microbatch may mean more tasks and/or longer tasks.

As used herein, a control layer (or control plane) is a layer comprising one or more entities (e.g., agents, applications, processes, services, etc.) that manage clusters of virtual machines deployed across a data processing system. As an example, the one or more entities includes a control manager (e.g., a service running on the control layer) that manages clusters, such as by accepting and processing cluster resize requests, etc. As another example, the one or more entities includes a service that manages execution of a data processing system's pipelines for processing data such as by allocating clusters (e.g., communicating a request for a cluster to be instantiated to a cluster manager or other entity, etc.), and by running the pipelines for processing data in the allocated clusters. An example of the service is a Delta Live Tables (DLT) service provided by Databricks, Inc. In some embodiments, such service communicates with another entity (e.g., a cluster manager) to resize clusters (e.g., to scale up/scale down clusters or virtual machines within a cluster). Note that scaling down the resources can reduce costs and/or free resources for other computing purposes.

As used herein, a data layer (or data plane) is a layer comprising one or more clusters of virtual machines. The data layer comprises a driver instance (e.g., a driver node or a primary node) and a plurality of worker instances (e.g., one or more clusters of a plurality of worker instances). The driver node manages the assignment of tasks to worker instances (e.g., to executor processes running on the corresponding worker instances). For example, the driver node comprises a driver service (also referred to herein as a cluster process) that runs on the driver node to manage the processing, by the worker instances, a set of tasks to be processed. Each worker instance comprises an executor process running on the worker instance. The executor process runs to process the task assigned to the worker instance (e.g., the task assigned to the particular executor process by the driver service running on the driver node).

As used herein, a task slot comprises one unit of computing resource capable of performing a single task at a time. In some embodiments, a task slot corresponds to a virtual machine that is a worker node in a cluster of virtual machines. In some embodiments, a task slot is a central processing unit (CPU) core. In some embodiments, each virtual machine has 1 worker (also referred to herein as a worker node, worker machine, or worker vm), each worker corresponds to one executor, and each executor has a certain number of predefined task slots (e.g., an entity that can process a task). In some embodiments, each worker comprises a single executor process, and the number of task slots for a particular executor process corresponds to a number of cores in the worker.

As used herein, a task means a small unit of operation or computation that is performed by a worker node (e.g., an executor process) in connection with processing a set of data. For example, a task can be filtering data or mapping each row of data onto another.

Related art systems generally comprise an agent in a control plane to determine whether to scale task-processing capacity. In such systems, the determination of whether to scale resources used to process data (e.g., whether to scale up/down the resources) is performed by an agent in a control layer (e.g., a control plane), such as a cluster manager. In order to determine whether to scale the resources, the control layer (e.g., the cluster manager) obtains and uses metrics from every cluster (e.g., resource utilization, queued tasks, etc.). In response to determining to scale the resources, the control layer (e.g., the cluster manager) then returns scaling instructions back to the clusters. At scale, as the number of clusters increases, the overhead associated with performing the determination of whether to scale the resources at the control layer serves as a constraint (e.g., because of the number of communications between the control layer and each of the clusters, etc.). Accordingly, related art systems are not a scalable architecture.

According to various embodiments, a system, method, and/or device for autoscaling task-processing capacity is disclosed. The system comprises one or more processors and a memory. The one or more processors are configured to (i) obtain input data from one or more data sources, determine, by a data layer, a set of the input data to process, (ii) obtain a current measure of queued tasks and/or a task-processing capacity, (iii) determine a set of tasks to process based at least in part on the set of the input data to process, and (iv) automatically scale the task-processing capacity based at least in part on (i) the current measure of the queued tasks, a measure of the task-processing capacity (e.g., a current number of task slots), and/or a measure of utilization of the task-processing capacity, and (ii) the set of tasks to process. In some embodiments, the current measure of the queued tasks corresponds to a task queue size (TQS). In some embodiments, the current measure of the task-processing capacity corresponds to an available number of task slots. In some embodiments, utilization of task-processing capacity corresponds to the use of the task slot (e.g., a task slot utilization (TSU) percentage or ratio).

According to various embodiments, a system, method, and/or device for autoscaling task-processing capacity is disclosed. The system comprises one or more processors and a memory. The one or more processors are configured to (i) obtain, at a data layer, a current measure of queued tasks and/or a task-processing capacity, (ii) obtain a cost-prioritized criterion or a latency-prioritized criterion, (iii) determine a set of tasks to process using the task-processing capacity based at least in part on a set of an input data to process, and (iv) automatically scale the task-processing capacity based at least in part on the current measure of queued tasks and/or the task-processing capacity and either (i) the cost-prioritized criterion or (ii) the latency-prioritized criterion. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria.

In some embodiments, the system uses task slots as a proxy for processing resources such as memory, processors, etc. Data that is to be processed by the system is deconstructed to a set of tasks (e.g., a set of tasks are determined to be processed in connection with processing a microbatch/batch of data). The system (e.g., a driver instance) assigns tasks from the set of tasks to be processed to task slots comprised in the system (e.g., to task slots among the cluster(s) of worker nodes). Various embodiments determine whether to automatically scale the task-processing capacity (e.g., resources used to process tasks such as worker instances, clusters of worker instances, etc.) based at least in part on one or more metrics pertaining to task slots of the system. A task slot is agnostic to the type of workload that is input for processing. For example, the task slot processes the tasks allocated thereto irrespective of the type of workload from which the task is determined. The use of one or more metrics pertaining to task slots in connection with determining whether to automatically scale (e.g., adjust) the task-processing capacity enables the system to make scaling decisions independent of a nature of workload, a pattern of the data, a data source from which the data is obtained, whether the data is input as streaming data or batched data, etc.

According to various embodiments, a task is a much closer abstraction of a workload that is to be performed. Some systems may use metrics such as CPU utilization, memory utilization, and the like to determine whether to scale certain resources. However, such metrics are more noisy and less relevant compared to the use of tasks. Accordingly, the use of tasks and/or task slots in connection with automatic scaling provides a simpler and more effective basis for determining whether to scale a task-processing capacity (e.g., a number of available task slots). Various embodiments automatically scale task-processing capacity based at least in part on a current number of task slots, a number of tasks to be performed, a number of tasks queued among the current set of task slots allocated to processing a set of data, and task slot utilization. The task-processing capacity may be further automatically scaled based at least in part on one or more scaling policies. The task slot utilization may correspond to a percentage of currently available task slots that are being used to process tasks.

According to various embodiments, the determination of whether to scale (e.g., scale up or scale down) the task-processing capacity of a system is performed at the data layer. The system uses a number of tasks to process (e.g., a number of tasks corresponding to a set of data that are queued and waiting for task slots and/or a number of tasks currently being processed at task slots) to determine whether to scale the task-processing capacity. In some embodiments, a process running on the data layer orchestrates tasks (e.g., assigns/allocates tasks to task slots, manages a status of the processing of the tasks, etc.). For example, the process can be a cluster process running on a driver node comprised in the data layer, data plane layer, or any other appropriate machine node. Information pertaining to an allocation of tasks across task slots and statuses of tasks to be processed is generally not readily available to entities comprised in the control layer. Accordingly, related art systems that determine scaling of resources at the control layer are generally not able to use tasks or task-processing capacity (e.g., number of task slots) in connection with determining whether to scale resources. For example, entities running on the control layer generally do not have access of data being processed by clusters or specific workers or nodes within the cluster(s) or by a single node. Rather, related art systems generally rely on external observations of clusters running in the data layer such as system-level metrics including CPU utilization, memory utilization, and the like. For example, some related art systems poll a driver service (e.g., a cluster process) running on a driver node periodically (e.g., every 5 seconds). Accordingly, the information used by the related art systems to determine whether to scale resources is relatively low resolution. In some embodiments, a service (e.g., a cluster process) running on the data layer determines whether to perform a scaling of the task-processing capacity based on metrics (e.g., rate of incoming data, processing time, latency of the stream processing, time delta between arrival of data and output of result, event time, etc.), statistics, cluster utilization (e.g., utilization of task slots), backlog of tasks, and/or latency (e.g., a currently experienced latency with respect to processing a task, or an expected latency with respect to processing a set of tasks for a set of data). The current measure of queued tasks and/or a task-processing capacity are obtained from a data structure that is exposed to the data layer and that is not exposed to a control layer. In some embodiments, backlog and latency metrics are obtained from a data structure that is exposed to the data layer and that is not exposed to a control layer.

In some embodiments, the system obtains (e.g., receives, retrieves, etc.) data to be processed from one or more data sources. In response to obtaining the data, the system determines a set of tasks that are to be performed in connection with processing the data. For example, the system determines whether data is bounded (e.g., whether the data is streaming data, or batched data). In the event that the data is not bounded (e.g., that the data is streaming data), the system determines a microbatch for the data, and determines a set of tasks to be performed in order to process the set of data comprised in the microbatch. According to various embodiments, the system determines a current measure of queued tasks and a current measure of a task-processing capacity (e.g., a number of slots comprised in the cluster(s) allocated to processing the data, such as clusters allocated to processing data for a particular user of the system). The system determines whether to scale the task-processing capacity based at least in part on (i) the current measure of the queued tasks, a measure of the task-processing capacity (e.g., a current number of task slots), and/or a measure of utilization of the task-processing capacity and (ii) the set of tasks to process. For example, the system determines (e.g., based at least in part on the current measure of task-processing capacity) whether the current task-processing capacity is sufficient to process set of tasks to be performed in connection with processing the data. In some embodiments, the system determines whether the current task-processing capacity is sufficient to process set of tasks to be performed in connection with processing the data based on one or more scaling policies, one or more latency thresholds set with respect to an expected latency incurred in processing the set of tasks, or one or more cost thresholds set with respect to an expected cost to process the set of tasks (e.g., a measure of time, resources, or money incurred as an expense to process the set of tasks, etc.). The one or more scaling policies, one or more latency thresholds, or one or more cost thresholds can be set based on user input (e.g., a user preference) or a profile associated with an organization such as a user of the service provided by the system. A latency threshold can be set based on a predefined latency service level agreement (e.g., a service level commitment that the service provider associated with the system agrees to with a user such as an organization for which the set of data is being processed).

According to various embodiments, one or more processes running on the data layer automatically determine whether to scale a task-processing capacity of the system (e.g., at least with respect to a particular user or to process a particular set of data, etc.) based at least in part on (i) the current measure of the queued tasks, a measure of the task-processing capacity (e.g., a current number of task slots), and/or a measure of utilization of the task-processing capacity, and (ii) the set of tasks to process. For example, a driver service (e.g., a cluster process) running on a driver node comprised in the data layer obtains the current measure of the queued tasks and/or the task-processing capacity, and the driver service determines whether to scale the task-processing capacity. In response to determining to scale the task-processing capacity (e.g., to scale up or scale down the task-processing capacity), the one or more processes running on the data layer (e.g., the driver service) communicates to one or more processes running on the control layer a request or indication for the task-processing capacity to be scaled. As an example, the driver service stores information pertaining to the determination to scale the task-processing capacity to an event log, and one or more processes running on the control layer obtains the information pertaining to the determination to scale the task-processing capacity from the event log. As another example, the driver service sends the request or indication to scale the task-processing capacity to the one or more processes on the control layer. In some embodiments, the one or more processes on the control layer to which the request or indication to scale the task-processing capacity is sent by the one or more processes running on the data layer is a cluster manager. In some embodiments, the one or more processes on the control layer to which the request or indication to scale the task-processing capacity is sent by the one or more processes running on the data layer is a service that manages execution of a data processing system's pipelines (e.g., workloads) for processing data such as by allocating clusters. The service that manages the execution of the data processing system's pipelines can thereafter send the request or indication to scale the task-processing capacity to the cluster manager. In response to the one or more processes running on the control layer (e.g., the control manager) receiving the request or indication to scale the task-processing capacity, the one or more processes running on the control layer causes the task-processing capacity to be adjusted (e.g., based at least in part on the request or indication to scale the task-processing capacity). For example, the request or indication to scale the task-processing capacity can include an indication of an extent to which the task-processing capacity is to be adjusted or a desired task-processing capacity (e.g., an adjusted task-processing capacity determined by the process running on the data layer). The one or more processes running on the control layer (e.g., the cluster manager) can spin-up or spin-down clusters or worker instances based on the request or indication to scale the task-processing capacity.

According to various embodiments, the system provides an interface via which a policy (e.g., a security policy), preference, or other configuration with respect to task-processing capacity is received. In response to receiving the policy, preference, or other configuration, the system sets the corresponding policy, preference, or other configuration in connection with autoscaling task-processing capacity for processing sets of data (e.g., workloads). Examples of policies, preferences, or other configurations include scaling policy, a cost threshold, a latency threshold, a priority (or relative priority) of satisfying a cost constraint, a priority (or relative priority) of satisfying a latency constraint, a preference indicating whether the system is to prioritize cost or latency in connection with determining whether/when to scale the task-processing capacity. In some embodiments, the interface is a user interface such as a graphical user interface that is provided at a client system or administrator system.

In some embodiments, a scaling policy comprises one or more of: (i) a minimum cost threshold, (ii) a maximum cost threshold, (iii) a minimum latency threshold, and (iv) a maximum latency threshold. The scaling policy can also further comprise a scaling function according to which the system determines whether to adjust the task-processing capacity and/or determines an extent to which the task-processing capacity is to be adjusted. In some embodiments, the scaling policy includes information pertaining to cluster configuration such as a minimum cluster size, a maximum cluster size, etc. In some embodiments, a scaling policy comprises one or more utilization thresholds (e.g., a high-utilization threshold, a low utilization threshold, etc.) such as a threshold used to compare the current measure of the TSU in connection with determining whether to scale the task-processing capacity. In some embodiments, a scaling policy comprises one or more number if queued task thresholds (e.g., a high queued-task threshold, a low queued-task threshold, etc.) such as a threshold used to compare the current measure of the number of queued tasks in connection with determining whether to scale the task-processing capacity. The threshold(s) comprised in the scaling policy can be tuned/configured (e.g., based on a user or organization preference) to adjust the cost sensitivity of the automatic scaling of the system and/or the latency sensitivity of the automatic scaling of the system.

According to various embodiments, the system provides a user interface to a user (e.g., via a client system, etc.) via which the user provides a preference indicating whether the system is to prioritize cost or latency in connection with determining whether/when to scale the task-processing capacity. As an example, the user interface comprises an element via which the user provides an input to toggle between whether the system is to prioritize cost or latency. For example, the user can input a cost-prioritized criterion indicating that the system is to prioritize cost over latency in connection with automatically scaling the task-processing capacity. As another example, the user can input a latency-prioritized criterion indicating that the system is to prioritize that the system is to prioritize latency over cost in connection with automatically scaling the task-processing capacity. The use of a simple interface to enable a user to make a binary selection of whether to prioritize cost or latency improves the convenience to the user/user and ease by which configurations of the autoscaling system can be set. In some embodiments, automatically scaling the task-processing capacity is based at least in part on a combination of (i) the cost-prioritized criterion and (ii) the latency-prioritized criterion. In some embodiments, a slide bar can be used to make a selection of a blend of cost-prioritized criterion and latency-prioritized criterion for autoscaling. In some embodiments, in response to receiving the preference indicating whether the system is to prioritize cost or latency, the system applies one or more preset scaling policies (e.g., a scaling policy for the system associated with the user such as a system that provides a service to the organization with which the user is associated). The one or more scaling policies can include a max/min cost threshold and/or a max/min latency threshold. In some embodiments, the scaling policy further includes a predefined scaling function. In some embodiments, the system automatically (e.g., without further user intervention/input) scales the task processing capacity based at least in part on (i) the cost/latency relative priority (e.g., the preference indicating whether the system is to prioritize cost or latency), and (ii) the one or more scaling policies. In some embodiments, the system automatically scales the task processing capacity based at least in part on the cost/latency relative priority, a predefined scaling function, and at least one of a maximum cost threshold, a minimum cost threshold, a maximum latency threshold, and a minimum latency threshold.

According to various embodiments, the system provides a user interface to a user (e.g., via a client system, etc.) via which the user provides a service level indication that indicates a performance characteristic with respect to an automatic scaling service. In some embodiments, the service indication level indicates (or comprises) a latency service level and a cost service level (or also referred to herein as a cost level). The system sets the one or more scaling policies based on the service level indication.

According to various embodiments, the system automatically scales task-processing capacity such as a task-processing capacity allocated for a user (e.g., to process a set of data for a particular user, etc.). The automatically scaling the task-processing capacity comprises (a) determining to adjust the task-processing capacity, (b) determining an adjusted task-processing capacity based at least in part on the current measure of queued tasks and either (i) the cost-prioritized criterion or (ii) the latency-prioritized criterion, and (c) determining to scale up or scale down the task-processing capacity based at least in part on a current task-processing capacity and the adjusted task-processing. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria.

According to various embodiments, the system automatically scales task-processing capacity such as a task-processing capacity allocated for a user (e.g., to process a set of data for a particular user, etc.). The automatically scaling the task-processing capacity comprises (a) determining to adjust the task-processing capacity, (b) determining whether scale up or scale down the task-processing capacity based at least in part on a current measure of queued tasks and one or more thresholds that are based at least in part on either (i) the cost-prioritized criterion or (ii) the latency-prioritized criterion, and (c) determining to scale up or scale down the task-processing capacity based at least in part on a current task-processing capacity and the adjusted task-processing capacity. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria.

In some embodiments, a cluster is an Apache Spark™ cluster (also referred to herein as a Spark cluster), which comprises a primary node (e.g., a driver node or driver instance), and a plurality of worker nodes (e.g., worker instances). The driver instance includes a driver (e.g., a Spark driver) that manages information pertaining to currently active executors (e.g., task slots) within the cluster, and tasks respectively running on the executors (e.g., the tasks being processed by the corresponding executors). The driver can assign tasks to task slots (e.g., to executors) within the cluster, and launch new tasks and assign such tasks to a corresponding task slot. Each worker node comprises an executor (e.g., a Spark executor), which is a process that runs on the node and executes tasks launched by the driver.

Various embodiments implementing the automatically scaling based at least in part on (i) the current measure of the queued tasks, a measure of the task-processing capacity (e.g., a current number of task slots), and/or a measure of utilization of the task-processing capacity, and (ii) the set of tasks to process have been shown to have significantly lower cost (e.g., half the cost) than related art systems that use CPU utilization, memory utilization, etc. in connection with determining whether to scale resources.

Various embodiments improve the extensibility of performing autoscaling agnostic of a type of data source (e.g., a data source that provides streaming data or batch data). Related art systems to scale resources are constrained to either processing streaming data or batch data. However, systems and methods according to various embodiments can process either or both of streaming data or batch data, and automatically scale resources such as task-processing capacity in connection with processing such data.

Various embodiments improve the scalability of performing autoscaling across a plurality of clusters. Related art systems use agents (e.g., a cluster manager), which reside in a control layer, to determine whether to scale resources. According to related art systems, the agent in the control layer queries each cluster to obtain performance or utilization metrics, determines whether to scale the resources among the plurality of clusters, and then communicates instructions to each of the plurality of clusters. As the number of clusters increases, the related art systems become constrained such as by the overhead associated with communicating between the agent at the control layer and the plurality of clusters. For example, at scale, systems are generally use hundreds or thousands of clusters in connection with processing a set of data. Accordingly, some related art systems overprovisioned the systems by having large clusters and thereby wasting resources (e.g., some machines or clusters would sit idle). For example, related art systems would periodically query/determine whether a task was running at a particular resource. However, the probability that a particular resource was processing a task when being queried/checked is relatively high thereby causing the system to rarely determine a need to scale down resources. Accordingly, such a query/check according to related systems is not an accurate assessment of a resource utilization. Systems and methods according to various embodiments improve the scalability at least because the determination of whether to scale resources (e.g., a task-processing capacity among the plurality of clusters) at the data layer, which has quicker and more extensive access to performance or utilization metrics across the plurality of clusters.

FIG. 1 is a block diagram of a system for automatically scaling task-processing resources according to various embodiments of the present application. According to various embodiments, system 100 implements at least part of process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, and/or process 1200 of FIG. 12.

In the example illustrated in FIG. 1, system 100 includes automatic scaling service 110, data store 120, data source 125, administrator system 130, and/or client system 140. In some embodiments, automatic scaling service 110, data store 120, and/or data source 125 are integrated (e.g., combined into a layer or a single set of server(s)). System 100 further includes one or more networks such as network 150 over which administrator system 130 and/or client system 140 communicates with automatic scaling service 110 data store 120, and/or data source 125. In various embodiments, network 150 includes one or more of a wired network, and/or a wireless network such as a cellular network, a wireless local area network (WLAN), or any other appropriate network. In some embodiments, data layer 112, control layer 114, and/or business application layer 116 are respectively implemented by one or more servers. System 100 may include various other systems or devices.

According to various embodiments, automatic scaling service 110 automatically scales a task-processing capacity of system 100 (e.g., task-processing capacity corresponding to cluster(s) 115. Automatic scaling service 110 can monitor a state of system (e.g., the task-processing capacity such as the task slots comprised in one or more clusters comprised in system 100, such as a cluster(s) comprised in data layer 112 of automatic scaling service 110) and/or a state of processing a set of tasks for a set of data (e.g., a number of queued tasks, a latency of processing a task, an expected latency of processing a set of tasks, task slot utilization, etc.). In response to the monitoring the system and/or processing of the set of tasks, automatic scaling service 110 determines whether to scale (e.g., adjust such as by scaling up or scaling down) the task-processing capacity of system 100 (e.g., the number of task slots in the one or more clusters comprised in system 100). In response to determining to scale the task-processing capacity, automatic scaling service 110 automatically scales the task-processing capacity (e.g., automatic scaling service 110 instantiates additional worker instances or clusters, or terminates existing worker instances or clusters, etc.).

In some embodiments, data source 125 comprises one or more data sources storing data to be processed by the task-processing capacity (e.g., by automatic scaling service 110). The one or more data sources can provide streaming data or batched data to the task-processing capacity for processing. The one or more data sources can be managed/maintained by an end user of automatic scaling service 110. The one or more data sources are operatively connected to automatic scaling service 110 to provide automatic scaling service 110 with the data to be processed and to obtain a result pertaining to processing of the data.

In some embodiments, data store 120 is a distributed data storage system. For example, data store 120 is a blob storage. In some embodiments, data store 120 comprises data for a plurality of users of automatic scaling service 110 (e.g., different organizations or tenants registered with automatic scaling service 110). As an example, the data for the plurality of users is not physically divided or segregated. For example, data among the plurality of users is virtually segregated (e.g., the data is segmented among users storage buckets respectively associated with a particular user). In some embodiments, data stored in data store 120 is encrypted such as by using a token associated with a particular user.

Automatic scaling service 110 comprises data layer 112, control layer 114, and business application layer 116. Automatic scaling service 110 uses data layer 112 to automatically determine whether to scale a task-processing capacity of system 100 (e.g., of a cluster comprised in data layer 112), such as based at least in part on (i) the current measure of the queued tasks, a measure of the task-processing capacity (e.g., a current number of task slots), and/or a measure of utilization of the task-processing capacity, and (ii) a set of tasks to process. Automatic scaling service 110 uses control layer 114 to scale the task-processing capacity, such as in response to a request or indication that the task-processing capacity is to be scaled that is provided by the data layer 112. Automatic scaling service 110 uses business application layer 116 to provide information to administrator system 130 and/or client system 140. For example, automatic scaling service 110 uses business application layer 116 to configure one or more user interfaces with which users receive or provide information pertaining to the processing of data by automatic scaling service 110.

In some embodiments, data layer 112 comprises one or more clusters such as cluster 115. As an example, cluster 115 can be a cluster that is instantiated and/or managed by control layer, such as by cluster manager 126 of control layer 114. In some embodiments, data layer instantiates a cluster on one or more servers outside automatic scaling service 110. In the example shown, data layer 112 comprises driver node 117 and one or more workers such as worker node(s) 119. For example, data layer 112 comprises at least one driver node 117. Driver node 117 can be a primary node in a cluster of virtual machines. As another example, data layer 112 comprises a driver node for each cluster comprised in data layer 112. In some embodiments, driver node 117 manages the performance of a set of tasks (e.g., a set of tasks that are to be performed to process a set of data) by worker node(s) 119. For example, driver node 117 allocates a task from the set of tasks to a task slot corresponding to a worker mode. Driver node 117 perform an allocation of each task of the set of tasks to corresponding task slots of the task-processing capacity corresponding to cluster 115 (e.g., tasks are assigned to executors running on worker node(s) 119).

According to various embodiments, driver node 117 determines whether to automatically scale the task-processing capacity (e.g., resources used to process tasks such as worker instances, clusters of worker instances, etc.) based at least in part on one or more metrics pertaining to task slots of the system.

In some embodiments, driver node 117 monitors a status of performance of the set of tasks (or a task comprised in the set of tasks) and a status of the task-processing capacity such as a utilization, a task queue, etc. As an example, driver node 117 obtains a current measure of queued tasks and/or a task-processing capacity. The current measure of the queued tasks can correspond to TQS with respect to the task slots comprised among worker node(s) 119. The current measure of the task-processing capacity can correspond to the number of task slots available for computation tasks and the measure of task slot utilization (e.g., TSU of task slots) can correspond with the percentage of the available task slots that are currently being used for computation. Driver node 117 automatically determines whether to scale the task-processing capacity (e.g., of worker node(s) 119) based at least in part on (i) the current measure of the queued tasks, a measure of the task-processing capacity (e.g., a current number of task slots), and/or a measure of utilization of the task-processing capacity, and (ii) the set of tasks to process.

In some embodiments, driver node 117 determines whether to scale the task-processing capacity (e.g., a number of task slots among worker node(s) 119) based at least in part on a user and/or scaling policy. For example, driver node 117 determines whether to scale the task-processing capacity based on one or more user and/or scaling policies and one or more metrics pertaining to task slots of the system and/or processing of a set of tasks. In connection with determining whether to scale the task-processing capacity, driver node 117 obtains information including metrics (e.g., rate of incoming data, processing time, latency of the stream processing, time delta between arrival of data and output of result, event time, etc.), statistics, cluster utilization (e.g., utilization of task slots), backlog of tasks, and/or latency (e.g., a currently experienced latency with respect to processing a task, or an expected latency with respect to processing a set of tasks for a set of data). Such information is stored in one or more data structures that expose such information to data layer 112 (e.g., to driver node 117). In some embodiments, at least some of such information (e.g., the TSU, the TQS, etc.) is not exposed (e.g., directly accessible by) control layer 114.

In some embodiments, driver node 117 determines a current measure of queued tasks and a current measure of a task-processing capacity (e.g., a number of slots comprised in the cluster(s) allocated to processing the data, such as clusters allocated to processing data for a particular user of the system). Driver node 117 (e.g., a process/service running on driver node 117, such as a cluster process) determines whether to scale the task-processing capacity based at least in part on (i) the current measure of the queued tasks, a measure of the task-processing capacity (e.g., a current number of task slots), and/or a measure of utilization of the task-processing capacity, and (ii) the set of tasks to process. For example, the system determines (e.g., based at least in part on the current measure of task-processing capacity) whether the current task-processing capacity is sufficient to process a set of tasks to be performed in connection with processing the data. In some embodiments, driver node 117 determines whether the current task-processing capacity is sufficient to process a set of tasks to be performed in connection with processing the data. Driver node 117 determines whether the current task-processing capacity is sufficient to process set of tasks based on one or more scaling policies, one or more latency thresholds set with respect to an expected latency incurred in processing the set of tasks, or one or more cost thresholds set with respect to an expected cost to process the set of tasks (e.g., a measure of time, resources, or money incurred as an expense to process the set of tasks, etc.). The one or more scaling policies, one or more latency thresholds, or one or more cost thresholds (or configurations of any thereof) can be set based on user input (e.g., a user preference) or a profile associated with an organization such as a user of the service provided by the system. For example, the one or more scaling policies, one or more latency thresholds, or one or more cost thresholds are set based on an input received by business application layer 116 from administrator system 130 or client system 140. A latency threshold can be set based on a predefined latency service level agreement (e.g., a service level commitment that the service provider associated with the system agrees to with a user such as an organization for which the set of data is being processed).

In response to determining to scale the task-processing capacity, data layer 112 (e.g., driver node 117) communicates to control layer 114 a request or indication to scale the task-processing capacity of system 100 (e.g., the task-processing capacity comprised in worker nodes 119).

In some embodiments, data layer 112 and control layer 114 communicate via an event log. Data layer 112 can store the request or indication to scale the task-processing capacity in an event log. For example, data layer 112 stores the request or indication to scale the task-processing capacity in a version of the event log that is stored at (or accessible to) data layer 112 and that is synced with a version of the event log that is stored at (or accessible to) control layer 114. The event log may be a bi-directional communication channel between data layer 112 and control layer 114 (e.g., between service 124 of control layer 114 and a cluster process running on driver node 117 of data layer 112). For example, automatic scaling service 110 maintains two copies of the event log-a copy comprised in (or maintained at) service 124 of control layer 114, and a copy comprised in (or maintained at) driver node 117 of data layer 112. Data layer 112 and control layer 114 can perform regular replication/communication (e.g., continuous replication, etc.) to ensure that the event log at data layer 112 and the event log at control layer 114 are kept in sync. Data layer 112 and control layer 114 can input requests or other indications or instructions to the event log. For example, data layer 112 (e.g., driver node 117) inputs a scaling request (e.g., a request to modify the task-processing capacity of the cluster, such as a request to scale up or scale down task slots) to the event log, and control layer 114 detects the scaling request and processes the scaling request (e.g., causes the cluster to be scaled in accordance with the scaling request and/or one or more scaling policies).

According to various embodiments, automatic scaling service 110 uses data layer 112 to determine a set of tasks to be performed in connection with processing data obtained from one or more data sources, such as data source 125. Data layer 112 obtains (e.g., receives, retrieves, etc.) data to be processed from one or more data sources such as data source 125. For example, a process running on driver node 117 periodically polls the one or more data sources for an indication of whether data is to be processed and/or information pertaining to such data to be processed (e.g., an amount of data to be processed, a type of data, etc.). Data layer 112 can obtain the data from the one or more data sources in response to determining that data is available at the one or more data sources. In response to obtaining the data, data layer 112 (e.g., the cluster process or other service, etc.) determines a set of tasks that are to be performed in connection with processing the data. For example, data layer 112 (e.g., the cluster process or other service, etc.) determines whether data is bounded (e.g., whether the data is streaming data, or batched data). In the event that the data is not bounded (e.g., that the data is streaming data), data layer 112 (e.g., the cluster process or other service, etc.) determines a microbatch for the data, and determines a set of tasks to be performed in order to process the set of data comprised in the microbatch.

In some embodiments, in response to determining the set of tasks to be performed, data layer 112 (e.g., the cluster process or other service, etc.) assigns the set of tasks to worker node(s) 119. For example, data layer 112 assigns the set of tasks to corresponding task slots comprised among worker node(s) 119.

According to various embodiments, automatic scaling service 110 uses control layer 114 to control a cluster (e.g., a cluster of virtual machines) comprised in data layer 112. For example, control layer 114 manages a configuration of the cluster (e.g., worker node(s) 119). In some embodiments, control layer 114 comprises service 124 and/or cluster manager 126. Service 125 can be a process that manages execution of the workload pipelines of system 100 (e.g., of the cluster running on data layer 112) for processing data such as by allocating clusters (e.g., communicating a request for a cluster to be instantiated to a cluster manager or other entity, etc.), and by running the pipelines for processing data in the allocated clusters. Cluster manager 126 is a service that managers clusters, such as by accepting and processing cluster resize requests, etc. Cluster manager 126 controls a configuration of the clusters running on data layer 112. For example, cluster manager 126 instantiates or terminates clusters on data layer 112. As another example, cluster manager 126 instantiates or terminates worker nodes on data layer 112. In some embodiments, automatic scaling service 110 uses cluster manager 126 to scale the task-processing capacity in response to driver node 117 (e.g., cluster process) determining that the task-processing capacity is to be scaled.

In some embodiments, if automatic scaling service 110 (e.g., driver node 117) determines that a number of pending tasks (e.g., a number of tasks in the set of tasks to be processed for data and/or number of currently queued tasks) exceeds the task-processing capacity, automatic scaling service 110 (e.g., driver node 117) determines to increase the task-processing capacity. For example, if automatic scaling service 110 (e.g., driver node 117) determines that the number of pending tasks exceeds the number of available task slots, automatic scaling service 110 (e.g., driver node 117) determines to increase (e.g., scale up) the number of task slots in automatic scaling service 110 (e.g., among worker node(s) 119), such as by instantiating additional cluster(s) or worker nodes within an existing cluster(s). In some embodiments, automatic scaling service 110 uses a scaling threshold in connection with determining whether to scale up the task-processing capacity. For example, automatic scaling service 110 determines to increase the task-processing capacity in response to a determination that the number of pending tasks exceeds the task-processing capacity at least to an extent equal to the scaling threshold. In some embodiments, automatic scaling service 110 uses a network of rules to determine an increase or decrease in the task-processing capacity. In some embodiments, rules in the network of rules can be a scale-up rule, a scale-down rule, a capacity-bounding rule, a persistent-low-utilization rule etc. For example, one can network the rules as follows: 1) run scale-up rule; 2) run scale-down rule; 3) run persistent-low-utilization rule; 4) if 2) generates a desired capacity, take it, otherwise take the result of 3); 5) if one or 1 or 4 generates a desired capacity, take it, otherwise no desired capacity is generated; and 6) run capacity-bounding rule on result of 5.

In some embodiments, the scaling threshold can be an absolute number of task slots or a percentage difference. For example, automatic scaling service 110 determines to scale up the task-processing capacity in response to determining that the number of pending tasks exceeds the task-processing capacity by at least 10%. Various other percentages can be implemented as the scaling threshold. The scaling threshold may be configurable such as by a user (e.g., a system administrator such as an administrator associated with the organization for which the data processing service is provided).

In some embodiments, if automatic scaling service 110 (e.g., driver node 117) determines that a number of pending tasks (e.g., a number of tasks in the set of tasks to be processed for data and/or number of currently queued tasks) is less than the task-processing capacity, automatic scaling service 110 determines to increase the task-processing capacity. For example, if automatic scaling service 110 determines that the number of pending tasks is less than the number of available task slots, the system determines to decrease (e.g., scale down) the number of task slots in automatic scaling service 110 (e.g., among worker node(s) 119), such as by spinning down one or more cluster(s) or worker nodes within an existing cluster(s). In some embodiments, automatic scaling service 110 uses a scaling threshold in connection with determine whether to scale down the task-processing capacity. For example, automatic scaling service 110 determines to decrease the task-processing capacity in response to a determination that the number of pending tasks is less than the task-processing capacity by some relation with the scaling threshold (e.g., less than the threshold, less than some number related to the threshold, less than some percentage related to the threshold, etc.). The scaling threshold can be an absolute number of task slots or a percentage difference. For example, automatic scaling service 110 determines to scale down the task-processing capacity in response to determining that the task-processing capacity the number of pending tasks exceeds the number of pending tasks by at least 10%. Various other percentages can be implemented as the scaling threshold. The scaling threshold may be configurable such as by a user (e.g., a system administrator such as an administrator associated with the organization for which the data processing service is provided). Scaling down the task-processing capacity can include scaling down instances or clusters with low utilization. A determination of whether instances or clusters have a low utilization can be based on a determination of whether utilization of the instances or clusters is less than a utilization threshold.

In some embodiments, scaling down the task-processing capacity includes terminating a cluster or worker instance (e.g., worker node among worker node(s) 119) in response to determining that scaling down the task-processing capacity includes terminating the cluster or worker instance. For example, automatic scaling service 110 terminates the cluster or worker instance immediately upon (or contemporaneous with) determining to scale down task-processing capacity (e.g., without permitting completion of tasks being then-processed by such cluster or worker instance). In some embodiments, scaling down the task-processing includes determining which cluster(s) or worker instance(s) to remove. In some embodiments, scaling down the task-processing includes graceful decommissioning the cluster(s) or worker instance(s) including allowing the finishing of processing of tasks already started to avoid losing work. In some embodiments, scaling down the task-processing includes rebalancing memory caches and/or local partial results to other cluster(s) or worker instance(s) to minimize disruption.

In some embodiments, scaling down the task-processing capacity includes terminating a cluster or worker instance. The cluster or worker instance can be terminated in response a decommissioning of the task slots (e.g., the executors). For example, the task slots processing tasks at the time that automatic scaling service 110 determines to terminate a cluster or worker instance are permitted to complete processing their tasks (and no further tasks are allocated to such cluster or worker instance), and upon completion of such tasks, automatic scaling service 110 terminates the cluster or worker instance. As another example, automatic scaling service 110 terminates the cluster or worker instance in response to a determination that all tasks being processed by the cluster or worker instance have completed and the corresponding data has been moved/stored. Permitting the cluster or worker instance to complete processing their tasks before termination reduces (e.g., eliminates) task failures that would otherwise result if automatic scaling service 110 immediately terminated the cluster or worker instance.

In some embodiments, automatic scaling service 110 determines to scale up task-processing capacity in response to a determination that (i) TQS is greater than 1, and (ii) TSU is greater than a high-utilization threshold. The high-utilization threshold can be predefined such as in a scaling policy. In response to determining to scale up the task-processing capacity, automatic scaling service 110 determines an adjusted task-processing capacity (e.g., a desired cluster size, a desired task-processing capacity, etc.). As an example, automatic scaling service 110 determines the adjusted task-processing capacity based on a number of current task slots and an average number of tasks waiting in a queue (e.g., an average TQS such as an average measured over a predetermined length of time). For example, automatic scaling service 110 determines the adjusted task-processing capacity to be a summation of a number of current task slots and an average number of tasks waiting in a queue. In response to determining the adjusted task-processing capacity, automatic scaling service 110 causes task-processing capacity to be adjusted to correspond to the adjusted task-processing capacity.

In some embodiments, automatic scaling service 110 determines to scale down task-processing capacity in response to a determination that (i) TQS is less than 1, and (ii) TSU is less than a low-utilization threshold. The low-utilization threshold can be predefined such as in a scaling policy. In response to determining to scale down the task-processing capacity, automatic scaling service 110 determines an adjusted task-processing capacity (e.g., a desired cluster size, a desired task-processing capacity, etc.). As an example, automatic scaling service 110 determines the adjusted task-processing capacity based on a number of current task slots and a number of idle task slots (e.g., an average number of such as an average measured over a predetermined length of time, a windowed average, etc.). In some embodiments, automatic scaling service 110 determines the adjusted task-processing capacity to be a difference between the number of current task slots and a fraction of the average number of tasks waiting in a queue (e.g., the product of a predetermined percentage and the average number of tasks waiting in the queue). The fraction can be configurable such by a user (e.g., in accordance with a user preference or organization preference). In response to determining the adjusted task-processing capacity, automatic scaling service 110 causes task-processing capacity to be adjusted to correspond to the adjusted task-processing capacity.

In some embodiments, automatic scaling service 110 determines to not adjust the task-processing capacity (e.g., neither scale up nor scale down the task-processing capacity) in response to a determination that the system (e.g., a current performance of the system) does not satisfy both the criteria (i) and (ii) as follows: (i): (a) TQS is greater than 1, and (b) TSU is greater than a high-utilization threshold; and (ii): (a) TQS is less than 1, and (b) TSU is less than a low-utilization threshold.

In some embodiments, the TQS and/or the TSU used in connection with determining whether to scale the task-processing capacity are averaged over a predetermined length of time (e.g., the TQS and TSU are windowed averages). The use of windowed averages in connection with determining whether to adjust the task-processing capacity make automatic scaling service 110 more robust and less likely to overreact or otherwise adjust task-processing capacity because of an anomaly or outlier (e.g., a transient load spike, etc.) that dissipates over a short period of time. Windowed averages may a lagging indicator of the load on the current task-processing capacity, thereby causing automatic scaling service 110 to be reactive in certain implementations. However, the use of windowed averages (e.g., with appropriate periods of time) may help ensure that automatic scaling service 110 does not react to transient load spikes (e.g., where scaling in response to such transient load spike would be costly or otherwise inefficient).

In some embodiments, automatic scaling service 110 determines whether to scale the task-processing capacity based on the TQS. Using the current TQS or a change (or extent of change) of the TQS to determine whether to scale the task-processing capacity can result in a more real-time determination than the use of windowed averages. For example, automatic scaling service 110 can monitor whether the task queue is growing (or is greater than 1) and in response to detecting such a condition, automatic scaling service 110 can cause the task-processing capacity to be adjusted accordingly. Automatic scaling service 110 can predict future TSU or TQS based at least in part on a monitoring of the current TQS and use such prediction in connection with proactively scaling the task-processing capacity.

In some embodiments, automatic scaling service 110 waits to adjust the task-processing capacity (e.g., in response to determining to scale the task-processing capacity) only after sufficient measurement of the impact of a prior adjustment to task-processing capacity can be ascertained. In other embodiments, automatic scaling service 110 waits to adjust the task-processing capacity (e.g., in response to determining to scale the task-processing capacity) until automatic scaling service 110 determines that a previous operation to adjust the task-processing capacity is complete. As an example, waiting until a previous operation to adjust the task-processing capacity is complete will provide automatic scaling service 110 with the opportunity to make the assessment of whether further scaling is required rather than performing the further scaling based on an outdated task-processing capacity measurement.

According to various embodiments, system 100 comprises an administrator system 130 for use by an administrator such as an administrator of automatic scaling service 110 or an administrator of a user associated with an instance or tenant being deployed by data layer 112 and/or data store 120. For example, administrator system 130 comprises a system for communication, data access, computation, etc. An administrator uses administrator system 130 to maintain data store 120 (e.g., maintain raw data comprised in data store 120), to define and manage applications provided by system 100, etc. For example, an administrator uses administrator system 130 to define one or more security policies that are to be enforced (e.g., by data store 120 or data layer 112) with respect to a data stored at data store 120. As another example, an administrator uses administrator system 130 to define one or more scaling policies that automatic scaling service 110 uses in connection with automatically scaling task-processing capacity. Administrator system 130 communicates with automatic scaling service 110 via a web-interface (e.g., by using a web browser, etc.). For example, administrator system 130 communicates with automatic scaling service 110 via a web-browser installed on administrator system 130 (e.g., via a user interface configured by an application running on business application layer 116). As another example, administrator system 130 communicates with automatic scaling service 110 via an application running on administrator system 130 (e.g., an application that communicates with an application running on business application layer 116).

According to various embodiments, system 100 comprises client system 140. Client system 140 is used by a user (e.g., a developer such as a developer of code, a developer of a model, a user of an organization associated with a one or more datasets stored at data store 120, etc.) to communicate with automatic scaling service 110 (e.g., data layer 112, a cluster instantiated on data layer 112, etc.) and/or data stored in data store 120. As an example, client system 140 communicates with automatic scaling service 110 via a web-interface. In some embodiments, a user uses client system 140 to develop code on a business application layer, which makes a call to with respect to data being processed at data layer 112 (or to invoke a task to be performed at data layer 112 with respect to certain data) or to data store 120, to modify code at a business application (e.g., to execute code against data stored in data store 120), to query data store 120 (e.g., in connection with discovering code, a library, a module, etc.), to request that data stored at data store 120 be processed by automatic scaling service 110, etc.

Figure 2:
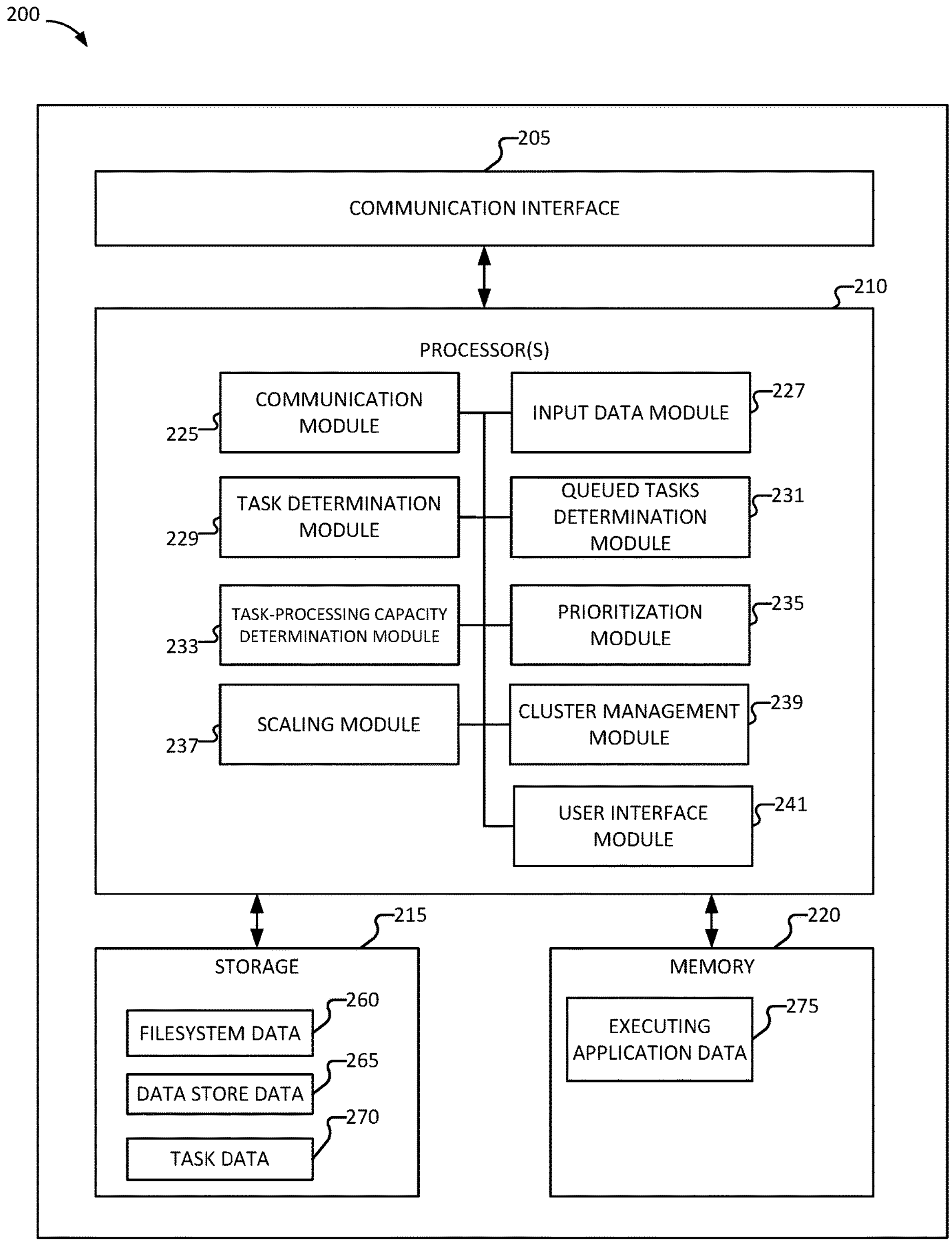
FIG. 2 is a block diagram of a system for automatically scaling task-processing resources according to various embodiments of the present application.

FIG. 2 is a block diagram of a system for automatically scaling task-processing resources according to various embodiments of the present application. According to various embodiments, system 200 is implemented at least in part by system 100 of FIG. 1. According to various embodiments, system 200 implements at least part of process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, and/or process 1200 of FIG. 12.

In the example shown, system 200 implements one or more modules in connection with automatically scaling task-processing capacity allocated to process a set of data (e.g., for a particular set of data, a particular user, a particular organization, etc.). System 200 comprises communication interface 205, one or more processors 210, storage 215, and/or memory 220. One or more processors 210 comprises one or more of communication module 225, input data module 227, task determination module 229, queued tasks determination module 231, task-processing capacity determination module 233, prioritization module 235, scaling module 237, cluster management module 239, and/or use interface module 241.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data request for data stored in a data store, a request to process data stored in a data store, a scaling policy, one or more thresholds associated with scaling a task-processing capacity (e.g., a latency threshold, a cost threshold, etc.), a preference indication (e.g., cost-prioritized criterion, a latency-prioritized criterion, etc.), system configuration such as a configuration for a cluster of virtual machines used to process data. The user input to the user system can include the creation of a new file, a modification or update to a file, a query for a file (e.g., a csv file, a library, a module, etc.), a request to set one or more security policies (e.g., a permission with respect to accessing a file or a directory), a request to set one or more scaling policies, etc. Communication module 225 is configured to provide to various user systems information such as user interface (e.g., an interface corresponding to a workspace or notebook), information that is responsive to one or more queries or tasks requested to be executed, locations at which data is to be accessed, credentials for accessing data, etc.

In some embodiments, system 200 comprises input data module 227. System 200 uses input data module 227 to obtain data to be processed. In some embodiments, input data module 227 receives data from one or more data sources. In some embodiments, input data module 227 polls the one or more data sources for data to process (e.g., input data module 227 checks to see whether the one or more data sources have data that is to be processed).

Input data module 227 obtains (e.g., receives, retrieves, etc.) the data to be processed from one or more data sources. In some embodiments, in connection with obtaining the data from the one or more data sources, input data module 227 pre-processes the data to ensure that the data is in discrete batches. For example, input data module 227 determines whether data is bounded (e.g., whether the data is streaming data, or batched data). In the event that the data is not bounded (e.g., that the data is streaming data), input data module 227 determines a microbatch for the data. In some embodiments, in the event that the data is bounded (e.g., that the data is batched data), input data module 227 merely obtains the data to the data and provides the data to task determination module 229. In some embodiments, in the event that the data is bounded, input data module 227 determines whether to divide an obtained batch of data into a plurality of microbatches, such as based on an efficiency (or expected efficiency) with which the system processes the tasks. Task determination module 229 can determine a size of a microbatch based on one or more of the data source, a reading speed corresponding to the data source, a type of information generated at the data source, a task-processing capacity, a number of tasks queued to be processed, and/or a mapping of number of task to an amount of data (e.g., a ratio of data to tasks expected from a particular data source or for data of a particular data type, etc.). For example, task determination module 229 dynamically determines the size of a microbatch based on an estimation that the system is able to keep processing tasks and keep up with incoming tasks. Task determination module 229 uses the set of data comprised in the microbatch to determine corresponding tasks to be performed by the system (e.g., by processing resources corresponding to a task slot).

In some embodiments, input data module 227 is implemented by data layer 112 of system 100 of FIG. 1, such as by driver node 117 (e.g., by a driver service, etc.).

In some embodiments, system 200 comprises task determination module 229. System 200 uses task determination module 229 to determine a set of tasks to be processed. In response to obtaining the data, system 200 determines a set of tasks that are to be performed in connection with processing the data. For example, task determination module 229 deconstructs the data to a set of tasks (e.g., a set of tasks are determined to be processed in connection with processing a microbatch/batch of data).

In some embodiments, task determination module 229 is implemented by data layer 112 of system 100 of FIG. 1, such as by driver node 117 (e.g., by a driver service, etc.).

In some embodiments, system 200 comprises queued tasks determination module 231. System 200 uses queued tasks determination module 231 to obtain information pertaining to a task queue for tasks to be processed. For example, queued tasks determination module 231 determines a task queue among task slots comprised in the task-processing capacity (e.g., system 200 or among worker node(s) 119 of data layer 112). In some embodiments, queued tasks determination module 231 determines current measure of the queued tasks. For example, queued tasks determination module 231 determines a current measure of queued tasks across all task slots (e.g., an aggregated task queue) allocated to process the set of data (e.g., all clusters and/or executors or worker nodes allocated to process the data). In some embodiments, queued tasks determination module 231 determines a TQS (e.g., a current measure of the TQS).

In some embodiments, queued tasks determination module 231 is implemented by data layer 112 of system 100 of FIG. 1, such as by driver node 117 (e.g., by a driver service, etc.). Accordingly, the current measure of the queued tasks is exposed to via a structure that is accessible by queued tasks determination module 231 but that is not directly accessible by a process running on the control layer.

In some embodiments, system 200 comprises task-processing capacity determination module 233. System 200 uses task-processing capacity determination module 233 to obtain information pertaining to a task-processing capacity such as a task-processing capacity allocated to process a set of data (e.g., task-processing capacity allocated to a particular user of automatic scaling service 110 or organization associated with the data to be processed, etc.). For example, task-processing capacity determination module 233 determines a task queue among task slots comprised in the task-processing capacity (e.g., system 200 or among worker node(s) 119 of data layer 112). In some embodiments, queued tasks determination module 231 determines a current measure of the task-processing capacity (e.g., a utilization of task-processing capacity, a cost of the current task-processing capacity, a current latency of task-processing capacity to process a task, time delta between arrival of data and output of result, event time, etc.). For example, queued tasks determination module 231 determines a current measure of the task-processing capacity across all task slots (e.g., an aggregated task-processing capacity) allocated to process the set of data (e.g., all clusters and/or executors or worker nodes allocated to process the data). In some embodiments, queued tasks determination module 231 determines a TSU (e.g., a current measure of the TSU).

In some embodiments, task-processing capacity determination module 233 is implemented by data layer 112 of system 100 of FIG. 1, such as by driver node 117 (e.g., by a driver service, etc.). Accordingly, the current measure of the task-processing capacity is exposed via a structure that is accessible by task-processing capacity determination module 233 but that is not directly accessible by a process running on the control layer.

In some embodiments, system 200 comprises prioritization module 235. System 200 uses prioritization module 235 to determine a prioritization to be applied with respect to allocating and/or scaling task-processing capacity to perform a set of tasks. For example, prioritization module 235 determines a relative priority with respect to a cost constraint and a latency constraint to be applied when determining a task-processing capacity to be allocated with respect to processing a set of tasks. As another example, prioritization module 235 determines a preference associated with whether to prioritize cost or latency in connection with task-processing capacity to be allocated with respect to processing a set of tasks for a set of data.

In some embodiments, prioritization module 235 determines the prioritization to be applied with respect to allocating and/or scaling task-processing capacity to perform a set of tasks based at least in part on one or more of (i) one or more scaling policies, and/or (ii) a preference indication received from a user via communication module 225 (e.g., via a user interface that is configured by user interface module 241). As an example, the preference indication can be a cost-prioritized criterion indicating that the system is to prioritize cost over latency in connection with automatically scaling the task-processing capacity. As another example, the preference indication can be a latency-prioritized criterion indicating that the system is to prioritize that the system is to prioritize latency over cost in connection with automatically scaling the task-processing capacity. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria.

In some embodiments, a scaling policy comprises one or more of: (i) a minimum cost threshold, (ii) a maximum cost threshold, (iii) a minimum latency threshold, and (iv) a maximum latency threshold. The scaling policy can also further comprise a scaling function according to which the system determines whether to adjust the task-processing capacity and/or determines an extent to which the task-processing capacity is to be adjusted. In some embodiments, the scaling policy includes information pertaining to cluster configuration such as a minimum cluster size, a maximum cluster size, etc. In some embodiments, a scaling policy comprises one or more utilization thresholds (e.g., a high-utilization threshold, a low utilization threshold, etc.) such as a threshold used to compare the current measure of the TSU in connection with determining whether to scale the task-processing capacity. The threshold(s) comprised in the scaling policy can be tuned/configured (e.g., based on a user or organization preference) to adjust the cost sensitivity of the automatic scaling of the system and/or the latency sensitivity of the automatic scaling of the system.

In some embodiments, prioritization module 235 is implemented by data layer 112 of system 100 of FIG. 1, such as by driver node 117 (e.g., by a driver service, etc.).

In some embodiments, system 200 comprises scaling module 237. System 200 uses scaling module 237 to determine a task-processing capacity to be allocated with respect to processing a set of tasks (e.g., for a set of data) and/or to determine whether to scale the task-processing capacity (e.g., whether to adjust a current task-processing capacity) such as by scaling up a task-processing capacity or scaling down a task-processing capacity. In some embodiments, scaling module 237 determines whether to automatically scale the task-processing capacity based at least in part on (i) the current measure of the queued tasks, a measure of the task-processing capacity (e.g., a current number of task slots), and/or a measure of utilization of the task-processing capacity, and (ii) the set of tasks to process. In response to determining to scale the task-processing capacity, scaling module 237 provides to cluster management module 239 (e.g., a cluster manager running on a control layer of automatic scaling service, etc.) a scaling indication request or indication for the task-processing capacity to be scaled.

In some embodiments, the data layer (e.g., scaling module 237) and control layer (e.g., cluster management module 239) communicate via an event log. The data layer can store the request or indication to scale the task-processing capacity in an event log. For example, the scaling module 237 stores the request or indication to scale the task-processing capacity in a version of the event log that is stored at (or accessible to) the data layer and that is synced with a version of the event log that is stored at (or accessible to) control layer 114. The event log may be a bi-directional communication channel between scaling module 237 (e.g., the data layer) and cluster management module 239 (e.g., the control layer). For example, system 200 maintains two copies of the event log-a copy comprised in (or maintained at) cluster management module 239 (e.g., a cluster manager running on a control layer), and a copy comprised in (or maintained at) at scaling module 237 (e.g., a driver service running on a drive node comprised in the data layer). Scaling module 237 and cluster management module 239 can perform regular replication/communication (e.g., continuous replication, etc.) to ensure that the event log at scaling module 237 and the event log at cluster management module 239 are kept in sync. Scaling module 237 and cluster management module 239 can input requests or other indications or instructions to the event log. For example, scaling module 237 inputs a scaling request (e.g., a request to modify the task-processing capacity of the cluster, such as a request to scale up or scale down task slots) to the event log, and cluster management module 239 detects the scaling request and processes the scaling request (e.g., causes the cluster to be scaled in accordance with the scaling request and/or one or more scaling policies).

In some embodiments, the data layer (e.g., scaling module 237) and control layer (e.g., cluster management module 239) communicate via a channel (e.g., a secure channel directly between the data layer and the control layer, such as a channel between the driver service (e.g., a cluster process) running on the data layer and the cluster manager running on the control layer.

In some embodiments, scaling module 237 automatically (e.g., without further user intervention/input) determines whether to scale to the task processing capacity based at least in part on (i) the cost/latency relative priority (e.g., the preference indicating whether the system is to prioritize cost or latency), and (ii) the one or more scaling policies. In some embodiments, scaling module 237 automatically determines to scale the task processing capacity based at least in part on the cost/latency relative priority, a predefined scaling function, and at least one of a maximum cost threshold, a minimum cost threshold, a maximum latency threshold, and a minimum latency threshold.

In some embodiments, scaling module 237 enforces one or more security policies in connection with determining whether to scale to the task processing capacity based on a current context of the task-processing capacity (e.g., a current TSU, a current TQS, a current latency measure, a current cost measure, etc.) and set of tasks to be processed.

In some embodiments, a scaling policy comprises one or more of: (i) a minimum cost threshold, (ii) a maximum cost threshold, (iii) a minimum latency threshold, and (iv) a maximum latency threshold. The scaling policy can also further comprise a scaling function according to which scaling module 237 determines whether to adjust the task-processing capacity and/or determines an extent to which the task-processing capacity is to be adjusted. In some embodiments, the scaling policy includes information pertaining to cluster configuration such as a minimum cluster size, a maximum cluster size, etc. In some embodiments, a scaling policy comprises one or more utilization thresholds (e.g., a high-utilization threshold, a low utilization threshold, etc.) such as a threshold used to compare the current measure of the TSU in connection with determining whether to scale the task-processing capacity. The threshold(s) comprised in the scaling policy can be tuned/configured (e.g., based on a user or organization preference) to adjust the cost sensitivity of the automatic scaling of system 200 and/or the latency sensitivity of the automatic scaling of system 200.

In some embodiments, scaling module 237 determines to scale up task-processing capacity in response to a determination that (i) TQS is greater than 1, and (ii) TSU is greater than a high-utilization threshold. The high-utilization threshold can be predefined such as in a scaling policy. In response to determining to scale up the task-processing capacity, scaling module 237 determines an adjusted task-processing capacity (e.g., a desired cluster size, a desired task-processing capacity, etc.). As an example, scaling module 237 determines the adjusted task-processing capacity based on a number of current task slots and an average number of tasks waiting in a queue (e.g., an average TQS such as an average measured over a predetermined length of time). For example, scaling module 237 determines the adjusted task-processing capacity to be a summation of a number of current task slots and an average number of tasks waiting in a queue. In response to determining the adjusted task-processing capacity, scaling module 237 causes task-processing capacity to be adjusted to correspond to the adjusted task-processing capacity.

In some embodiments, scaling module 237 determines to scale down task-processing capacity in response to a determination that (i) TQS is less than 1, and (ii) TSU is less than a low-utilization threshold. The low-utilization threshold can be predefined such as in a scaling policy. In response to determining to scale down the task-processing capacity, scaling module 237 determines an adjusted task-processing capacity (e.g., a desired cluster size, a desired task-processing capacity, etc.). As an example, scaling module 237 determines the adjusted task-processing capacity based on a number of current task slots and a number of idle task slots (e.g., an average number of such as an average measured over a predetermined length of time, a windowed average, etc.). In some embodiments, scaling module 237 determines the adjusted task-processing capacity to be a difference between the number of current task slots and a fraction of the average number of tasks waiting in a queue (e.g., the product of a predetermined percentage and the average number of tasks waiting in the queue). The fraction can be configurable such by a user (e.g., in accordance with a user preference or organization preference). In response to determining the adjusted task-processing capacity, scaling module 237 causes task-processing capacity to be adjusted to correspond to the adjusted task-processing capacity.

In some embodiments, scaling module 237 determines to not adjust the task-processing capacity (e.g., neither scale up nor scale down the task-processing capacity) in response to a determination that the system (e.g., a current performance of the system) does not satisfy both the criteria (i) and (ii) as follows: (i): (a) TQS is greater than 1, and (b) TSU is greater than a high-utilization threshold; and (ii): (a) TQS is less than 1, and (b) TSU is less than a low-utilization threshold.

In some embodiments, scaling module 237 enforces a scaling policy with respect to determining whether to scale the task-processing capacity. Enforcing the scaling policy can include applying one or more scaling functions. For example, scaling module 237 applies a bi-objective optimization function to determine a task-processing capacity f that minimizes cost c(f) and the latency l(f), where c(f) corresponds to a cost associated with f task slots (e.g., f executors, etc.) and l(f) corresponds to a latency associated with using f task slots (e.g., to process the set of tasks). f is a positive integer. As another example, scaling module 237 applies a bi-objective optimization function to determine a task-processing capacity f that minimizes cost c(f) and the latency l(f), where $F_L \leq f \leq F_U$. $F_L$ corresponds to a minimum number of task slots, which can be configured/set according to a user or organization preference (e.g., based on a user input such as in connection with defining the scaling policy). $F_U$ corresponds to a maximum number of task slots, which can be configured/set according to a user or organization preference (e.g., based on a user input such as in connection with defining the scaling policy).

In some embodiments, the scaling function corresponds to determining, from among all (or a threshold number of) configurations (e.g., task-processing capacities) with a measure of latency less than L, a configuration having a minimum cost (or a configuration having a cost less than a cost threshold). L corresponds to a maximum acceptable value for the latency. L can be set configurable such as according to a user or organization preference (e.g., based on a user input such as in connection with defining the scaling policy). In some embodiments, the foregoing scaling function is enforced in response to a determination that a relative priority with respect to latency is higher than a relative priority with respect to cost (e.g., if the user has provided a preference indication indicating that latency is to be given preference in determining the autoscaling of the task-processing capacity). The foregoing scaling function can be represented by Equation (1).

$$\min_f \{c(f): l(f) \leq L; F_L \leq f \leq F_U\} \tag{1}$$

In some embodiments, the scaling function corresponds to determining, from among all (or a threshold number of) configurations (e.g., task-processing capacities) with a measure of cost less than C, a configuration having a minimum latency (or a configuration having a latency less than a latency threshold). C corresponds to a maximum acceptable value for the cost. C can be set configurable such as according to a user or organization preference (e.g., based on a user input such as in connection with defining the scaling policy). In some embodiments, the foregoing scaling function is enforced in response to a determination that a relative priority with respect to cost is higher than a relative priority with respect to latency (e.g., if the user has provided a preference indication indicating that cost, such as reducing cost, is to be given preference in determining the autoscaling of the task-processing capacity). The foregoing scaling function can be represented by Equation (2).

$$\min_f \{l(f): c(f) \leq C; F_L \leq f \leq F_U\} \tag{2}$$

In some embodiments, the scaling function corresponds to determining, from among all (or a threshold number of) configurations (e.g., task-processing capacities) that minimize latency, a configuration having a minimum cost (or a configuration having a cost less than a cost threshold). In some embodiments, the foregoing scaling function is enforced in response to a determination that a relative priority with respect to latency is higher than a relative priority with respect to cost (e.g., if the user has provided a preference indication indicating that latency is to be given preference in determining the autoscaling of the task-processing capacity). The foregoing scaling function can be represented by Equation (3). The scaling function according to Equation (3) may be stricter than the scaling function according to Equation (1) because instead of considering the solutions that satisfy a particular (e.g., user-defined) latency constraint, the scaling function according to Equation (3) only considers those configurations with the minimum latency and from that set of configurations having the minimum latency the configuration having the minimum cost is selected.

$$\min_f \{c(f); f = \operatorname{argmin}_g \{l(g): F_L \leq g \leq F_U\}\} \tag{3}$$

In some embodiments, the scaling function corresponds to determining, from among all (or a threshold number of) configurations (e.g., task-processing capacities) that minimize cost, a configuration having a minimum latency (or a configuration having a latency less than a latency threshold). In some embodiments, the foregoing scaling function is enforced in response to a determination that a relative priority with respect to cost is higher than a relative priority with respect to latency (e.g., if the user has provided a preference indication indicating that cost, such as reducing cost, is to be given preference in determining the autoscaling of the task-processing capacity). The foregoing scaling function can be represented by Equation (4). The scaling function according to Equation (4) may be stricter than the scaling function according to Equation (2) because instead of considering the solutions that satisfy a particular (e.g., user-defined) cost constraint, the scaling function according to Equation (4) only considers those configurations with the minimum cost and from that set of configurations having the minimum cost the configuration having the minimum latency is selected.

$$\min_f \{l(f); f = \arg\min_g \{c(g): F_L \leq g \leq F_U\}\} \tag{4}$$

According to various embodiments, in response to determining that scaling module 237 is to apply a latency preference (e.g., scaling module 237 determines that a relative priority of cost is higher than a relative priority of latency), scaling module 237 applies a latency-preferred scaling function.

In some embodiments, the latency-preferred scaling function comprises a set of scale-up conditions (e.g., conditions, which in response to being satisfied, cause scaling module 237 to scale up the task-processing capacity): an average TQS>1, and an average TSU>0.8 (or other user-defined TSU threshold). The average TQS and TSU can correspond to a measure over a predetermined period (e.g., a windowed average over 3 minutes or other user-defined time period). Various other scale-up conditions can be implemented based on the scaling policy, or user or organization preference. In response to scaling module 237 determining that the scale-up conditions are satisfied (e.g., that all the scale-up conditions are satisfied), scaling module 237 determines an extent to which the task-processing capacity is to be increased. For example, scaling module 237 determines an adjusted task-processing capacity. In some embodiments, the latency-preferred scaling function comprises a set of scale up parameters used in connection with determining an extent to which the task-processing capacity is to be scaled up: (i) set a desired number of task slots equal to a summation of an average TQS and a current number of task slots; (ii) set an increase ratio equal to a desired number of task slots divided by the current number of task slots, and (iii) set a new number of executors equal to the minimum of: (a) a maximum number of executors and a result from a ceiling function of a product of a current number of executors and the increase ratio (e.g., number of new executors=min ([maximum number of executors], Ceiling (current number of executors*increase ratio)). In response to determining the new number of executors (or adjusted task-processing capacity), scaling module 237 provides the new number of executors cluster to management module 239 for cluster management module 239 to adjust the corresponding task-processing capacity.

In some embodiments, the latency-preferred scaling function comprises a set of scale-down conditions (e.g., conditions, which in response to being satisfied, cause scaling module 237 to scale down the task-processing capacity): an average TQS<1, and an average TSU<0.5 (or other user-defined TSU threshold). The average TQS and TSU can correspond to a measure over a predetermined period (e.g., a windowed average over 3 minutes or other user-defined time period). Various other scale-down conditions can be implemented based on the scaling policy, or user or organization preference. In response to scaling module 237 determining that the scale-down conditions are satisfied (e.g., that all the scale-down conditions are satisfied), scaling module 237 determines an extent to which the task-processing capacity is to be decreased. For example, scaling module 237 determines an adjusted task-processing capacity. In some embodiments, the latency-preferred scaling function comprises a set of scale down parameters used in connection with determining an extent to which the task-processing capacity is to be scaled down: (i) set an decrease ratio=1−(1−average TSU*threshold scale−down percentage) minus a desired number of task slots divided by the current number of task slots, and (iii) set a new number of executors equal to the minimum of: (a) a minimum number of executors and a result from a round function of a product of a current number of executors and the decrease ratio (e.g., number of new executors=max ([minimum number of executors], Round (current number of executors*decrease ratio)). The threshold scale-down percentage can be user defined or otherwise set in the scaling policy. In response to determining the new number of executors (or adjusted task-processing capacity), scaling module 237 provides the new number of executors (or the adjusted task-processing capacity) to cluster management module 239 for cluster management module 239 to adjust the corresponding task-processing capacity.

The latency-preferred scaling function can implement a different TSU threshold value with respect to a scale-up condition or a scale-down condition. In the examples above, the scale-up condition implements an average TSU>0.8 as the TSU threshold value, and the scale-down condition implements an average TSU<0.5 as the TSU threshold value. As an example, the difference between threshold values used as scale-up conditions versus scale-down conditions ensures an operating range in which the task-processing capacity is not adjusted, such as to avoid scaling decisions based on transient load spikes.

According to various embodiments, in response to determining that scaling module 237 is to apply a cost preference (e.g., scaling module 237 determines that a relative priority of latency is higher than a relative priority of cost), scaling module 237 applies a cost-preferred scaling function.

In some embodiments, the cost-preferred scaling function comprises a set of scale-up conditions (e.g., conditions, which in response to being satisfied, cause scaling module 237 to scale up the task-processing capacity): an average TSU>0.7 (or other user-defined TSU threshold) and an average TQS is larger than a product of a current number of task slots and a TSU scale up threshold factor. The TSU scale up threshold factor can be user defined or otherwise set in the scaling policy. The average TQS and TSU can correspond to a measure over a predetermined period (e.g., a windowed average over 6 minutes or other user-defined time period). Various other scale-up conditions can be implemented based on the scaling policy, or user or organization preference. In response to scaling module 237 determining that the scale-up conditions are satisfied (e.g., that all the scale-up conditions are satisfied), scaling module 237 determines an extent to which the task-processing capacity is to be increased. For example, scaling module 237 determines an adjusted task-processing capacity. In some embodiments, the cost-preferred scaling function comprises a set of scale up parameters used in connection with determining an extent to which the task-processing capacity is to be scaled up (or to determine the adjusted task-processing capacity): (i) set desired TQS=current number of task slots* ([TQS scale−up threshold factor]+ [TQS scale down threshold factor])/2; (ii) set desired number of task slots=current number of task slots+average TQS-desired TQS, and (iii) set an increase ratio=(desired number of task slots)/(current number of task slots); (iv) set new number of executors=Min ([maximum number of executors], Ceiling (current number of executors*increase ratio)). In response to determining the new number of executors (or adjusted task-processing capacity), scaling module 237 provides the new number of executors to cluster management module 239 for cluster management module 239 to adjust the corresponding task-processing capacity.

In some embodiments, the cost-preferred scaling function comprises a set of scale-down conditions (e.g., conditions, which in response to being satisfied, cause scaling module 237 to scale down the task-processing capacity): an average TSU<0.7 (or other user-defined TSU threshold), and average TQS<product of number of executors and TQS scale down threshold factor (e.g., the TQS scale down threshold factor can be 1 or other user-defined value). The average TQS and TSU can correspond to a measure over a predetermined period (e.g., a windowed average over 3 minutes or other user-defined time period). Various other scale-down conditions can be implemented based on the scaling policy, or user or organization preference. In response to scaling module 237 determining that the scale-down conditions are satisfied (e.g., that all the scale-down conditions are satisfied), scaling module 237 determines an extent to which the task-processing capacity is to be decreased. For example, scaling module 237 determines an adjusted task-processing capacity. In some embodiments, the latency-preferred scaling function comprises a set of scale down parameters used in connection with determining an extent to which the task-processing capacity is to be scaled down: (i) set desired TQS=current number of task slots*([TQS scale up threshold factor]+ [TQS scale down threshold factor])/2; (ii) set desired number of task slots=current number of task slots+average TQS-desired TQS; (iii) set decrease ratio=[desired number of task slots]/[current number of task slots]; and (iv) set new number of executors=max ([minimum number of executors], round ([current number of executors] *[decrease ratio])). The minimum number of executors, TQS scale up threshold factor, and/or TQS scale down threshold factor can be user defined or otherwise set in the scaling policy. In response to determining the new number of executors (or adjusted task-processing capacity), scaling module 237 provides the new number of executors (or the adjusted task-processing capacity) to cluster management module 239 for cluster management module 239 to adjust the corresponding task-processing capacity.

In some embodiments, system 200 comprises cluster management module 239. System 200 uses cluster management module 239 to control a set of virtual machines or clusters of virtual machines that are deployed at the data layer. The cluster management module 239 can reside in the control layer (e.g., control layer 114 of automatic scaling service 110). In some embodiments, system 200 uses cluster management module 239 to scale the task-processing capacity. For example, in response to scaling module 237 determining to scale-up the task-processing capacity (e.g., increase the number of task slots or executors), cluster management module 239 scales up the task-processing capacity such as by instantiating additional worker node(s) or clusters of worker nodes. As another example, in response to scaling module 237 determining to scale-down the task-processing capacity (e.g., decrease the number of task slots or executors), cluster management module 239 scales down the task-processing capacity such as by terminating additional worker node(s) or clusters of worker nodes or otherwise reallocating such worker nodes or clusters to another system (e.g., a system that processes data for a different set of data sources or user, etc.).

In some embodiments, system 200 comprises user interface module 241. System 200 uses user interface module 241 to provide information to a user system (e.g., administrator system 130 and/or client system 140 of system 100 of FIG. 1). User interface module 241 configures and provides a user interface such as an interface that is to be displayed on a web browser installed at the user system, or an application interface for an application (e.g., a web application) running at the user system. In some embodiments, user interface module 241 provides a user interface via which a scaling policy, a preference indication, a cost threshold, and/or a latency threshold can be set by a user via the user system. User interface module 241 can further provide a user interface to administrator system 130 to enable an administrator to manage and/or configuring settings of system 200 (e.g., automatic scaling service 110). For example, configurations pertaining to one or more data sources for which data is to be processed, cluster configurations (e.g., a number of worker nodes per cluster, a number of executors running on each worker node, etc.) can be set via a user interface provided by user interface module 241. In some embodiments, user interface module 241 provides a user interface for various other applications such as applications provided by a business application layer.

According to various embodiments, user interface module 241 provides a user interface to a user (e.g., via a client system, etc.) via which the user provides a preference indicating whether the system is to prioritize cost or latency in connection with determining whether/when to scale the task-processing capacity. As an example, the user interface comprises an element via which the user provides an input to toggle between whether the system is to prioritize cost or latency. For example, the user can input a cost-prioritized criterion indicating that the system is to prioritize cost over latency in connection with automatically scaling the task-processing capacity. As another example, the user can input a latency-prioritized criterion indicating that the system is to prioritize that the system is to prioritize latency over cost in connection with automatically scaling the task-processing capacity. The use of a simple interface to enable a user to make a binary selection of whether to prioritize cost or latency improves the convenience to the user/user and ease by which configurations of the autoscaling system can be set. In some embodiments, in response to receiving the preference indicating whether system 200 is to prioritize cost or latency (e.g., via a user interface provided by user interface module 241), system 200 applies one or more preset scaling policies (e.g., a scaling policy for the system associated with the user such as a system that provides a service to the organization with which the user is associated). The one or more scaling policies can include a max/min cost threshold(s) and/or a max/min latency threshold(s). In some embodiments, the scaling policy further includes a predefined scaling function. The scaling function can be defined by a user via a user interface provided by user interface module 241.

According to various embodiments, storage 215 comprises one or more of filesystem data 260, data store data 265, and/or task data 270. Storage 215 comprises a shared storage (e.g., a network storage system) and/or database data, and/or user activity data.

In some embodiments, filesystem data 260 comprises a database such as one or more datasets (e.g., one or more datasets for one or more features, etc.). Filesystem data 260 comprises data such as a code being developed, code used in connection with development of a model, data generated in connection with executing code, modules imported into a workspace, etc. In some embodiments, filesystem data 260 comprises data pertaining to a cluster instantiated to provide data to a user. Filesystem data 260 comprises data pertaining to one or more configurations such as a security policy, a cost threshold, a latency threshold, a preference such as a preference indication (e.g., a cost-prioritized criterion, a latency-prioritized criterion, a combination of cost-prioritized criterion and latency-prioritized criterion, etc.). For example, filesystem data 260 comprises one or more of: (i) a minimum cost threshold, (ii) a maximum cost threshold, (iii) a minimum latency threshold, and (iv) a maximum latency threshold.

In some embodiments, data store data 265 comprises information pertaining to the data store and/or data stored on the data store. As an example, data store data 265 stores an index of data stored on the data store, location information indicating a location at which data is stored on the data store, etc. In some embodiments, data store data 264 comprises a set of data to be processed such as one or more microbatches of data (e.g., determined based on information provided by one or more data sources), or a batch of data.

In some embodiments, task data 270 comprises information pertaining to a set of tasks that have been processed by system 200 or that are to be processed by system 200. For example, task data 270 comprises an allocation of the set of tasks to task slots (e.g., a mapping of tasks to task slots such as a mapping of tasks to executors or worker nodes, etc.). As another example, task data 270 comprises information pertaining to a status of the set of tasks (e.g., a mapping of tasks to corresponding statuses). As another example, task data 270 comprises information pertaining to a task queue such as a number of tasks queued to be processed, an indication of the tasks that are queued (e.g., a list of task identifiers for tasks that are in the task queue), etc.

According to various embodiments, memory 220 comprises executing application data 275. Executing application data 275 comprises data obtained or used in connection with executing an application such as an application executing in connection with providing the access to data stored on the data store, an application that enforces security of data in the data store, an application that monitors data and operations of the data store, an application that executes code being developed in a workspace, an application that performs an automatic scaling of task-processing capacity (e.g., based at least in part on (i) the current measure of the queued tasks, a measure of the task-processing capacity (e.g., a current number of task slots), and/or a measure of utilization of the task-processing capacity, and (ii) the set of tasks to process). In embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
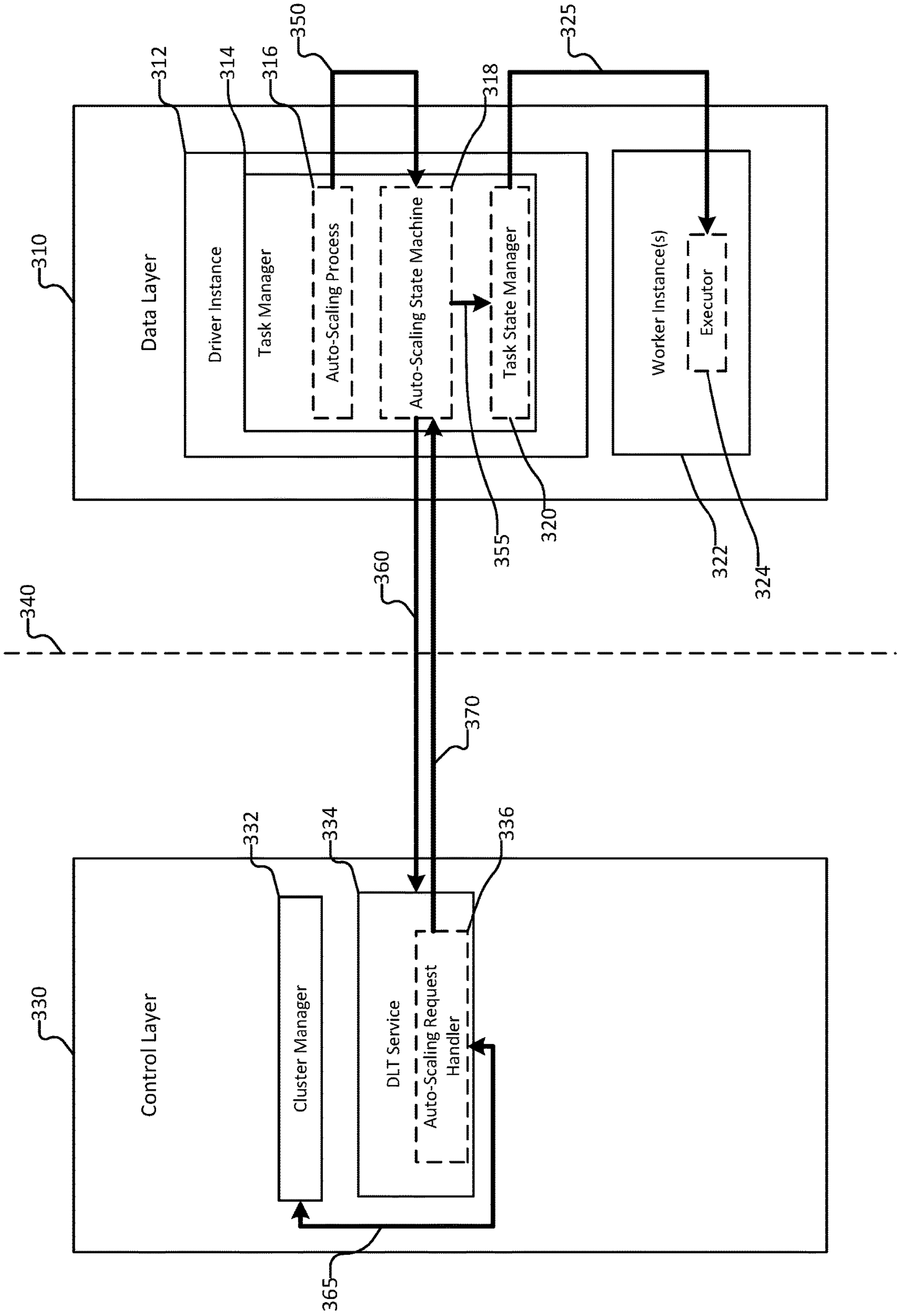
FIG. 3 is a diagram of an example of an automatic scaling processing according to various embodiments of the present application.

FIG. 3 is a diagram of an example of an automatic scaling processing according to various embodiments of the present application. In some embodiments, system 300 can be implemented at least in part by system 100 of FIG. 1 and/or system 200 of FIG. 2. In the example shown, system 300 comprises data layer 310 and control layer 330.

Data layer comprises driver instance 312 (e.g., a driver node), and a set of one or more worker instances 322. Driver instance 31 comprises task manager 314 (e.g., a driver service or cluster process, etc.). Task manager 314 can comprise an automatic scaling process 315, an automatic scaling state machine 318, and a task state manager 320. In some embodiments, a driver service (e.g., cluster process) implements the automatic scaling process 315, an automatic scaling state machine 318, and/or a task state manager 320 embodiments. The set of one or more worker instances 322 comprise executor(s) 324. For example, each worker instance can comprise one or more executor(s) 324.

Control layer 330 comprises cluster manager 332 and service 334. Cluster manager 332 can control a number of worker instances or executors being run (e.g., instantiated) among the set of one or more worker instances 322. Service 334 can manage execution of a data processing system's pipelines for processing data such as by allocating clusters (e.g., communicating a request for a cluster to be instantiated to a cluster manager or other entity, etc.), and by running the pipelines for processing data in the allocated clusters.

At 350, automatic scaling process 316 determines whether to scale the task-processing capacity (e.g., the number of executor(s) 324 among the set of one or more worker instances 322). As an example, automatic scaling process 316 runs in the background during the processing of a set of data (e.g., a pipeline of a workload to a data processing system). Automatic scaling process 316 can periodically make scaling decisions based on a monitoring of a current status of system 300 (e.g., a number of executor(s) 324, a cost to run the number of executor(s) 324, a latency provided by the number of executor(s) 324, a set of tasks to be processed, a task queue, etc.). Automatic scaling process 316 provides a determination of whether to scale the task processing capacity to automatic scaling state machine 318. In some embodiments, automatic scaling process 316 provides to automatic scaling state manager 318 a result of the determination of whether to scale the task processing capacity in response to determining that the task-processing capacity is to be adjusted (e.g., scaled). In some embodiments, at 325 task state manager 320 monitors execution of tasks being processed by executor(s) 324. For example, task state manager 320 determines one or more of a state of the processing of a particular task, a utilization of the executor(s) 324, a task queue for tasks to be processed by executor(s) 324, etc.

At 355, automatic scaling state machine 318 provides to task state manager 320 an indication that the set of one or more worker instances 322 is to be adjusted. For example, automatic scaling state machine 318 provides to task state manager 320 an indication that cluster changes are to be made in connection with scaling the task-processing capacity.

At 360, automatic scaling state machine 318 provides to control layer 330 an indication that task-processing capacity is to be adjusted. In some embodiments, automatic scaling state machine 318 writes the request or indication for the task-processing capacity to be scaled to an event log. For example, automatic scaling state machine 318 writes the request or indication for the task-processing capacity to be scaled to a version of the event log stored at (or accessible to) data layer 310. The version of the event log stored at (or accessible to) data layer 310 is synced with a version of the event log stored at (or accessible to) control layer 330. In some embodiments, for so long as this request is not fulfilled by control layer 330 by scaling the cluster (e.g., the number of executors) to the desired size, automatic scaling state machine 318 will periodically keep retrying and regenerating this request to ensure that the scaling occurs eventually. Service 334 obtains the request or indication for the task-processing capacity to be scaled from the event log (e.g., version the event log stored at (or accessible to) control layer 330).

At 365, service 334 provides the request or indication for the task-processing capacity to be scaled (or information pertaining to such request or indication) to cluster manager 332. For example, in response to receiving the request or indication for the task-processing capacity to be scaled, service 334 queries cluster manager 332 for a current size and state of the cluster, and compares the current size/state of the cluster with information comprised in the request or indication for the task-processing capacity to be scaled (e.g., the adjusted task-processing capacity indicated by the request such as the desired number of executors, etc.). In response to determining that the current size/state of the cluster is different from the information comprised in the request or indication for the task-processing capacity to be scaled, service 334 communicates a request to cluster manager 332 to adjust the task-processing capacity (e.g., to change the number of worker instances, etc.). In response to determining that the current size/state of the cluster is not different from the information comprised in the request or indication for the task-processing capacity to be scaled (e.g., that the request has been satisfied), service 334 indicates that such request to scale the task-processing capacity has been completed.

In response to receiving a request from service 334 (or from the event log stored at control layer 330), cluster manager 332 adjusts the task-processing capacity. For example, cluster manager 332 instantiates additional worker instances or clusters in response to a request to scale up the task-processing capacity. As another example, cluster manager 332 terminates (or deallocates) worker instances or clusters from the processing the set of tasks in response to a request to scale down the task-processing capacity. In some embodiments, in response to receiving a request from service 334 to adjusts the task-processing capacity, cluster manager 332 determines whether the request is already being acted on by cluster manager 332 (e.g., cluster manager 332 determines whether an adjustment is already underway/in progress). In response to determining that the request is already being acted on by cluster manager 332, cluster manager 332 rejects the request from service 334. In response to determining that the request is not already being acted on by cluster manager 332, cluster manager 332 accepts the request and initiates a process to scale the task-processing capacity.

At 370, control layer 370 communicates to data layer 310 an indication that the request or indication for the task-processing capacity to be scaled has been completed. In some embodiments, service 334 (or cluster manager 332) stores to the event log an indication that the request has been completed (e.g., that the task-processing capacity has been successfully adjusted).

Figure 4:
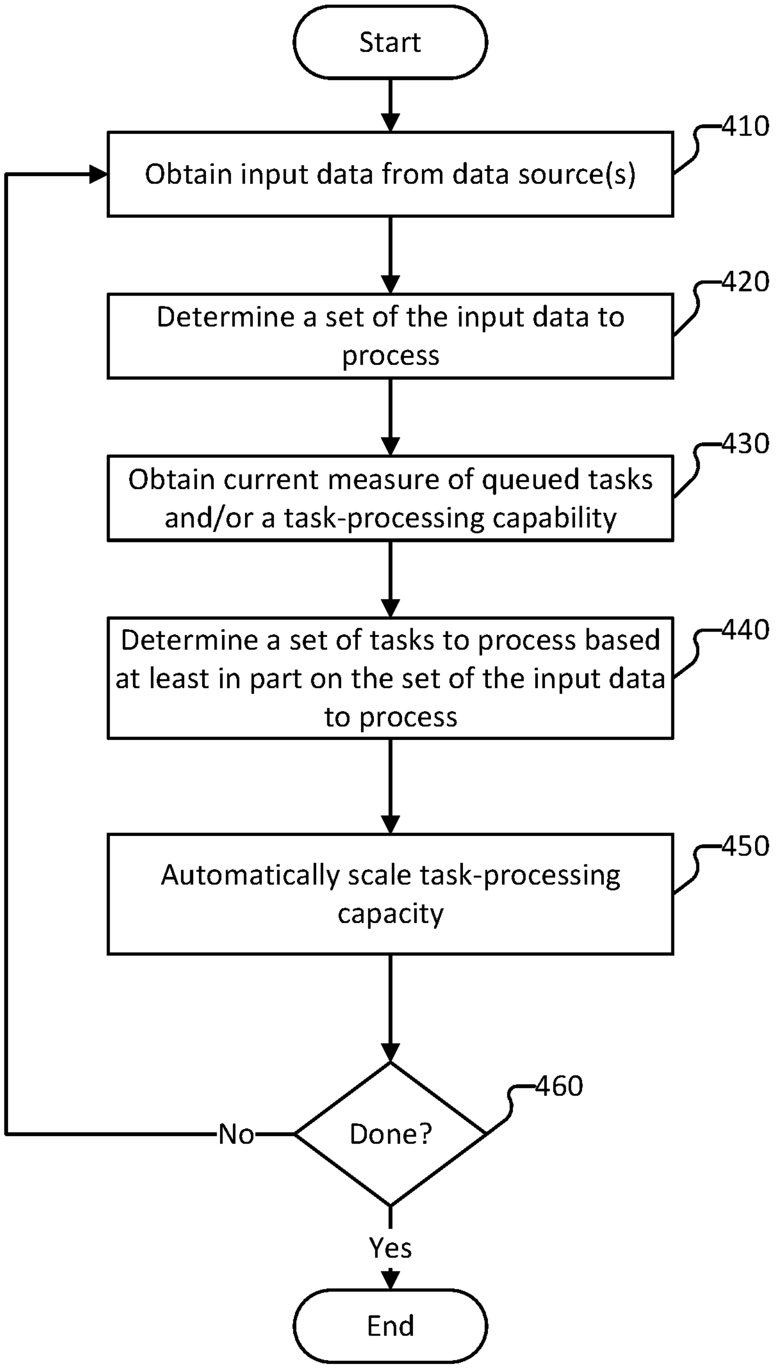
FIG. 4 is a flow diagram of a method for automatically scaling task-processing capacity according to various embodiments of the present application.

FIG. 4 is a flow diagram of a method for automatically scaling task-processing capacity according to various embodiments of the present application. In some embodiments, at least part of process 400 is implemented by system 100 of FIG. 1 or system 200 of FIG. 2.

At 410, input data is obtained from a data source(s). In some embodiments, obtaining the input data from a data source includes obtaining an indication that data to be processed is available at the data source(s). For example, the system queries the data source(s) for an indication of whether the data source(s) have data to be processed, or an indication of an amount of data to be processed and/or other characteristic information pertaining to the data to be processed (e.g., a type of data, a type of data source, etc.).

At 420, a set of the input data to process is determined. In response to obtaining the input data, the system determines a set of the input data to process. For example, in response to determining that the input data is streaming data, the system determines one or more microbatches of the set of input data to be processed. As another example, in response to determining that the input data is batched data, the system determines whether the batched data is to be processed without further dividing into one or more microbatches, or whether to divide the batched data one or more microbatches the set of input data to be processed.

At 430, a current measure of queued tasks and/or task-processing capacity is obtained. In some embodiments, the current measure of the queued tasks corresponds to a task queue size (TQS). In some embodiments, the current measure of the task-processing capacity corresponds to a task slot utilization (TSU).

In some embodiments, a service (e.g., a cluster process) running on the data layer obtains metrics (e.g., rate of incoming data, processing time, latency of the stream processing, time delta between arrival of data and output of result, event time, etc.), statistics, cluster utilization (e.g., utilization of task slots), backlog of tasks, and/or latency (e.g., a currently experienced latency with respect to processing a task, or an expected latency with respect to processing a set of tasks for a set of data). The current measure of queued tasks and/or a task-processing capacity are obtained from a data structure that is exposed to the data layer and that is not exposed to a control layer.

At 440, a set of tasks to process is determined based at least in part on the set of input data to process. In response to obtaining the data, the system determines a set of tasks that are to be performed in connection with processing the data. For example, the system deconstructs the set of input data to process into a set of tasks that are to be performed in connection with processing such set of input data.

At 450, the task-processing capacity is automatically scaled. In some embodiments, the system determines to automatically scale the task-processing capacity based on a scaling policy, the set of input data to process, and the current measure of queued tasks and/or task-processing capacity. The automatic scaling of the task-processing capacity includes determining, at a data layer (e.g., by a driver service or other cluster process), whether to scale the task-processing capacity, and in response to determining to scale the task-processing capacity causing a control layer (e.g., a cluster manager running on the control layer) to correspondingly scale (e.g., adjust) the task-processing capacity. In some embodiments, the data layer (e.g., a driver service or other cluster process running on the data layer) determines an extent to which the task-processing capacity is to be adjusted. For example, the data layer determines an adjusted task-processing capacity.

In some embodiments, a service (e.g., a cluster process) running on the data layer determines whether to perform a scaling of the task-processing capacity based on metrics (e.g., rate of incoming data, processing time, latency of the stream processing, time delta between arrival of data and output of result, event time, etc.), statistics, cluster utilization (e.g., utilization of task slots), backlog of tasks, and/or latency (e.g., a currently experienced latency with respect to processing a task, or an expected latency with respect to processing a set of tasks for a set of data). The current measure of queued tasks and/or a task-processing capacity are obtained from a data structure that is exposed to the data layer and that is not exposed to a control layer.

At 460, a determination is made as to whether process 400 is complete. In some embodiments, process 500 is determined to be complete in response to a determination that no further tasks are to be processed, no further input data is obtained or otherwise to be processed, the processing of tasks is paused or stopped, a user has exited the system, an administrator indicates that process 400 is to be paused or stopped, etc. In response to a determination that process 400 is complete, process 400 ends. In response to a determination that process 400 is not complete, process 400 returns to 410.

Figure 5:
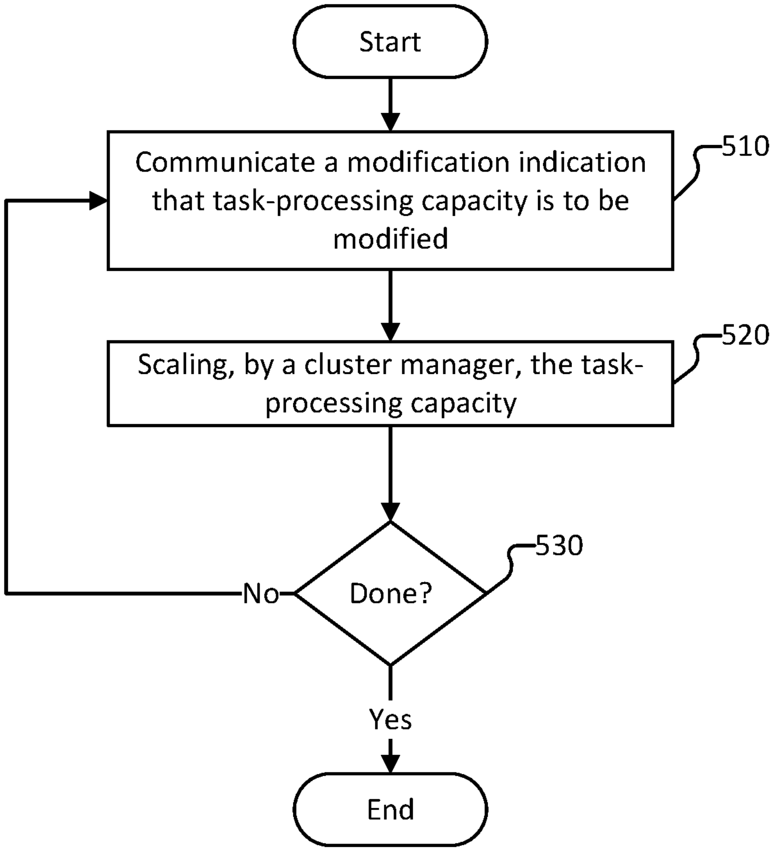
FIG. 5 is a flow diagram of a method for scaling task-processing capacity according to various embodiments of the present application.

FIG. 5 is a flow diagram of a method for scaling task-processing capacity according to various embodiments of the present application. In some embodiments, at least part of process 500 is implemented by system 100 of FIG. 1 or system 200 of FIG. 2. As an example, process 500 is implemented by control layer 114 of automatic scaling service 110 and/or by cluster management module 239 of system 200.

At 510, a modification indication that the task-processing capacity is to be modified is communicated. As an example, the modification indication corresponds to a request for the task-processing capacity to be scaled. In some embodiments, the data layer (e.g., a driver service or cluster process running on the data layer) provides the modification indication to a control layer (e.g., a service or cluster manager running on the control layer). For example, the data layer writes the modification indication to an event log that is synced between the data layer and the control layer. As another example, the control layer obtains the modification indication from the event log.

At 520, the cluster manager scales the task-processing capacity. In response to obtaining the modification indication, the cluster manager correspondingly scales the task-processing capacity. For example, in response to the modification indication indicating that the task-processing capacity is to be scaled up (e.g., in response to determining that an adjusted task-processing capacity in the modification indication is greater than a current ask-processing capacity), the cluster manager running on the control layer instantiates one or more additional worker instances. As another example, in response to the modification indication indicating that the task-processing capacity is to be scaled down (e.g., in response to determining that an adjusted task-processing capacity in the modification indication is less than a current ask-processing capacity), the cluster manager running on the control layer terminate or deallocate one or more worker instances from the task-processing capacity used to process the set of input data.

At 530, a determination is made as to whether process 500 is complete. In some embodiments, process 500 is determined to be complete in response to a determination that no further tasks are to be processed, no further input data is obtained or otherwise to be processed, the processing of tasks is paused or stopped, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
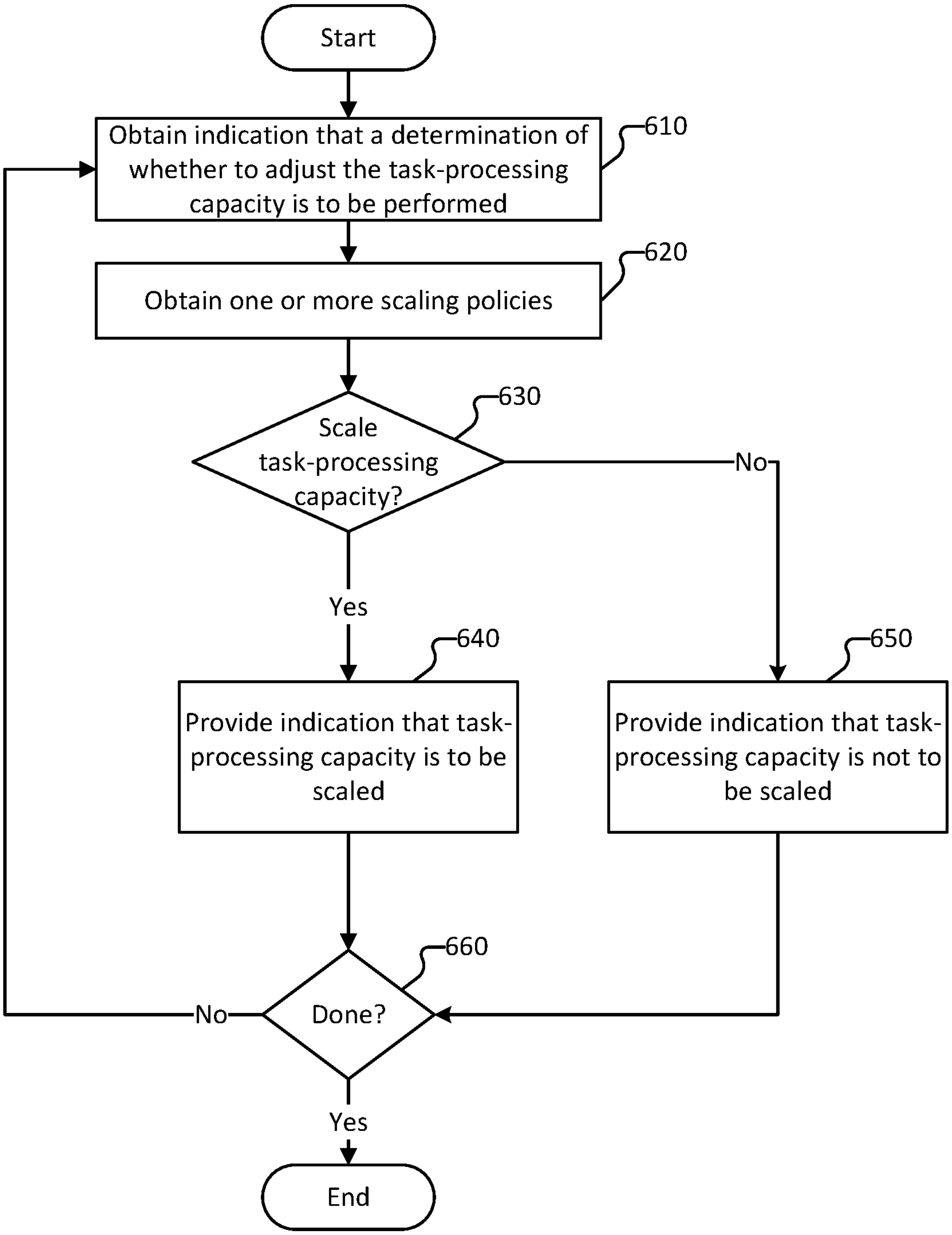
FIG. 6 is a flow diagram of a method for determining whether to scale task-processing capacity according to various embodiments of the present application.

FIG. 6 is a flow diagram of a method for determining whether to scale task-processing capacity according to various embodiments of the present application. In some embodiments, at least part of process 600 is implemented by system 100 of FIG. 1 or system 200 of FIG. 2.

At 610, an indication that a determination of whether to adjust the task-processing capacity is to be performed is obtained. The indication that the determination of whether to adjust the task-processing capacity can be generated by an automatic scaling service that periodically (e.g., continuously) determines whether to adjust the task-processing capacity.

At 620, one or more scaling policies is obtained. The one or more scaling policies can be obtained from a data store, or a data structure comprised in (or accessible to) the data layer. In some embodiments, the one or more scaling policies are configured by a user such as an administrator of an automatic scaling service, an administrator of a user of automatic scaling service, or an administrator of a system for which the set of data is to be processed, etc.

At 630, a determination of whether to scale the task-processing capacity is performed. In some embodiments, the determination of whether to scale the task-processing capacity is performed at the data layer, such as by a driver service or cluster process running on the data layer.

In response to determining to scale the task-processing capacity at 630, process 600 proceeds to 640 at which an indication that the task-processing capacity is to be scaled is provided. Providing the indication that the task-processing capacity is to be scaled can include storing, by a data layer, information pertaining to the scaling of the task-processing capacity (e.g., a request to scale the task-processing capacity) to an event log. The information pertaining to the scaling of the task-processing capacity can include a desired adjusted task-processing capacity. The control layer (e.g., a cluster manager process running on the control layer) obtains the indication from the data layer, such as via retrieval of the indication or information pertaining to the scaling of the task-processing capacity from the event log.

Conversely, in response to determining to scale the task-processing capacity at 630, process 600 proceeds to 650 at which an indication that the task-processing capacity not be scaled is provided. In some embodiments, 650 is omitted and an indication is only provided in response to determining that the task-processing capacity is to be adjusted (e.g., scaled).

At 660, a determination is made as to whether process 600 is complete. In some embodiments, process 600 is determined to be complete in response to a determination that no further tasks are to be processed, no further input data is obtained or otherwise to be processed, the processing of tasks is paused or stopped, a user has exited the system, an administrator indicates that process 600 is to be paused or stopped, etc. In response to a determination that process 600 is complete, process 600 ends. In response to a determination that process 600 is not complete, process 600 returns to 610.

Figure 7:
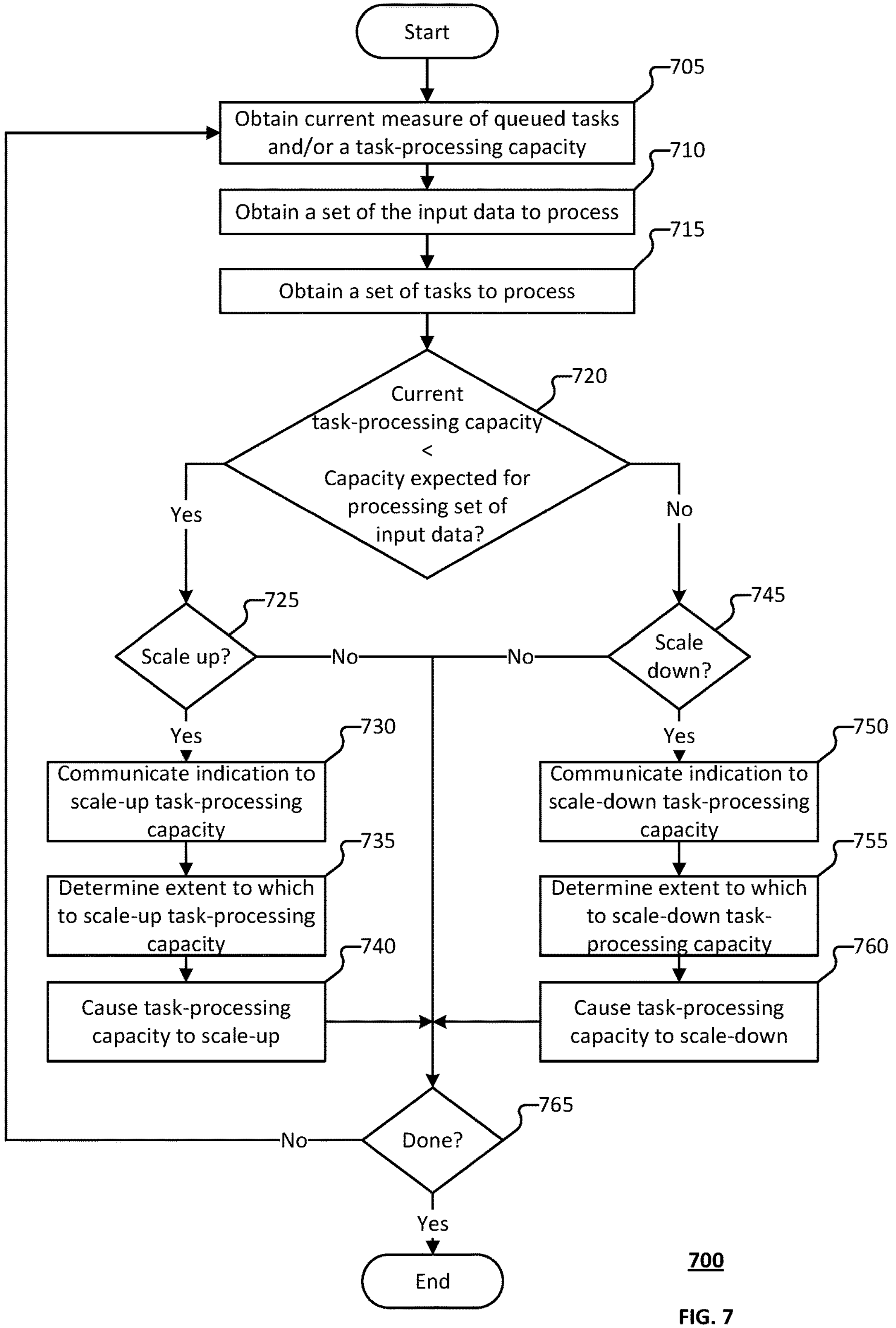
FIG. 7 is a flow diagram of a method for automatically scaling task-processing capacity according to various embodiments of the present application.

FIG. 7 is a flow diagram of a method for automatically scaling task-processing capacity according to various embodiments of the present application. In some embodiments, at least part of process 700 is implemented by system 100 of FIG. 1 or system 200 of FIG. 2. In some embodiments, process 700 is implemented at a data layer of system 100 or system 200. For example, process 700 is implemented by a driver service or cluster process running on the data layer.

At 705, a current measure of queued tasks and/or a task-processing capacity is obtained. In some embodiments, 705 corresponds to, or is similar to, 430 or process 400 of FIG. 4.

At 710, a set of the input data to process is obtained. In some embodiments, 710 corresponds to, or is similar to, 420 or process 400 of FIG. 4.

At 715, a set of tasks to process is obtained. In some embodiments, the system determines the set of tasks to process based at least in part on the set of input data to process. For example, the system deconstructs the set of input data to a set of tasks that are to be performed in connection with processing the input data. In some embodiments, 715 corresponds to, or is similar to, 420 or process 400 of FIG. 4.

At 720, a determination of whether the current task-processing capacity is less than an expected capacity for processing the set of input data is performed. In some embodiments, the system determines an expected cost or expected latency associated with processing the set of tasks using the current task-processing capacity and determines whether such expected cost or expected latency satisfies one or more predefined service levels (e.g., a cost service level or a threshold service level, which may be respectively defined in the scaling policy). In some embodiments, the system determines whether a current task-processing capacity satisfies a preference indication such as an indication received from a user as to whether to prioritize cost or latency, etc. In some embodiments, the system determines whether a current latency satisfies a defined latency service level (e.g., a latency service level defined in the scaling policy). For example, if the latency associated with processing a task exceeds the latency service level, the system determines to adjust the task-processing capacity. In some embodiments, the system determines whether a number of tasks in the tasks queue exceeds a threshold number (e.g., a TQS threshold). For example, if the number of tasks in the tasks queue exceeds a threshold number (e.g., associated with a service level), the system determines to adjust the task-processing capacity.

In response to determining that the current task-processing capacity is less than an expected capacity for processing the set of input data at 720, process 700 proceeds to 725 at which a determination of whether to scale up the task-processing capacity is performed.

In response to determining to scale up the task-processing capacity at 725, process 700 proceeds to 730 at which the system communicates an indication to scale up the task-processing capacity. In some embodiments, in response to a process running on data layer determining to scale up the task-processing capacity, the process provides the indication that the task-processing capacity is to be scaled up. In some embodiments, 730 may be omitted.

At 735, an extent to which the task-processing capacity is to be scaled up is determined. In some embodiments, the system determines a number of new task slots to instantiate (e.g., a number of worker instances, a number of executors, etc.). In some embodiments, the system determines an adjusted task-processing capacity, which can correspond to a desired task-processing capacity to process the set of tasks, etc. The system determines the extent to which the task-processing capacity is to be scaled (or the adjusted task-processing capacity) based at least in part on the set of input data to process and a current measure of the queued tasks or a current measure of the task-processing capacity. In some embodiments, the system determines the adjusted task-processing capacity based at least in part on a scaling policy (e.g., a scaling function defined in the scaling policy, one or more cost thresholds, one or more latency thresholds, or other thresholds), a current measure of the queued tasks and/or a current measure of the task-processing capacity, and the set of tasks to process.

At 740, the task-processing capacity is caused to scale up. Thereafter, process 700 proceeds to 765. In some embodiments, causing the task-processing capacity to scale up comprises causing a cluster manager running on a control layer of the system to adjust the task-processing capacity (e.g., in accordance with a request or indication for task-processing capacity to be scaled, which may include an adjusted task-processing capacity). In some embodiments, causing the task-processing capacity to scale up comprises communicating to the control layer request or indication for task-processing capacity to be scaled. The request or indication for task-processing capacity to be scaled can be communicated to the control layer via an event log that is synced between the data layer and the control layer.

In response to determining that the current task-processing capacity is not less than an expected capacity for processing the set of input data at 720, process 700 proceeds to 745 at which a determination of whether to scale down the task-processing capacity is performed.

In response to determining to scale down the task-processing capacity at 725, process 700 proceeds to 750 at which the system communicates an indication to scale down the task-processing capacity. In some embodiments, in response to a process running on data layer determining to scale up the task-processing capacity, the process provides the indication that the task-processing capacity is to be scaled up. In some embodiments, 750 may be omitted.

At 755, an extent to which the task-processing capacity is to be scaled down is determined. In some embodiments, the system determines a number of new task slots to instantiate (e.g., a number of worker instances, a number of executors, etc.). In some embodiments, the system determines an adjusted task-processing capacity, which can correspond to a desired task-processing capacity to process the set of tasks, etc. The system determines the extent to which the task-processing capacity is to be scaled (or the adjusted task-processing capacity) based at least in part on the set of input data to process and a current measure of the queued tasks or a current measure of the task-processing capacity. In some embodiments, the system determines the adjusted task-processing capacity based at least in part on a scaling policy (e.g., a scaling function defined in the scaling policy, one or more cost thresholds, one or more latency thresholds, or other thresholds), a current measure of the queued tasks and/or a current measure of the task-processing capacity, and the set of tasks to process.

At 760, the task-processing capacity is caused to scale down. Thereafter, process 700 proceeds to 765. In some embodiments, causing the task-processing capacity to scale down comprises causing a cluster manager running on a control layer of the system to adjust the task-processing capacity (e.g., in accordance with a request or indication for task-processing capacity to be scaled, which may include an adjusted task-processing capacity). In some embodiments, causing the task-processing capacity to scale down comprises communicating to the control layer request or indication for task-processing capacity to be scaled. The request or indication for task-processing capacity to be scaled can be communicated to the control layer via an event log that is synced between the data layer and the control layer.

At 765, a determination is made as to whether process 700 is complete. In some embodiments, process 700 is determined to be complete in response to a determination that no further tasks are to be processed, no further input data is obtained or otherwise to be processed, the processing of tasks is paused or stopped, a user has exited the system, an administrator indicates that process 700 is to be paused or stopped, etc. In response to a determination that process 700 is complete, process 700 ends. In response to a determination that process 700 is not complete, process 700 returns to 705.

Figure 8:
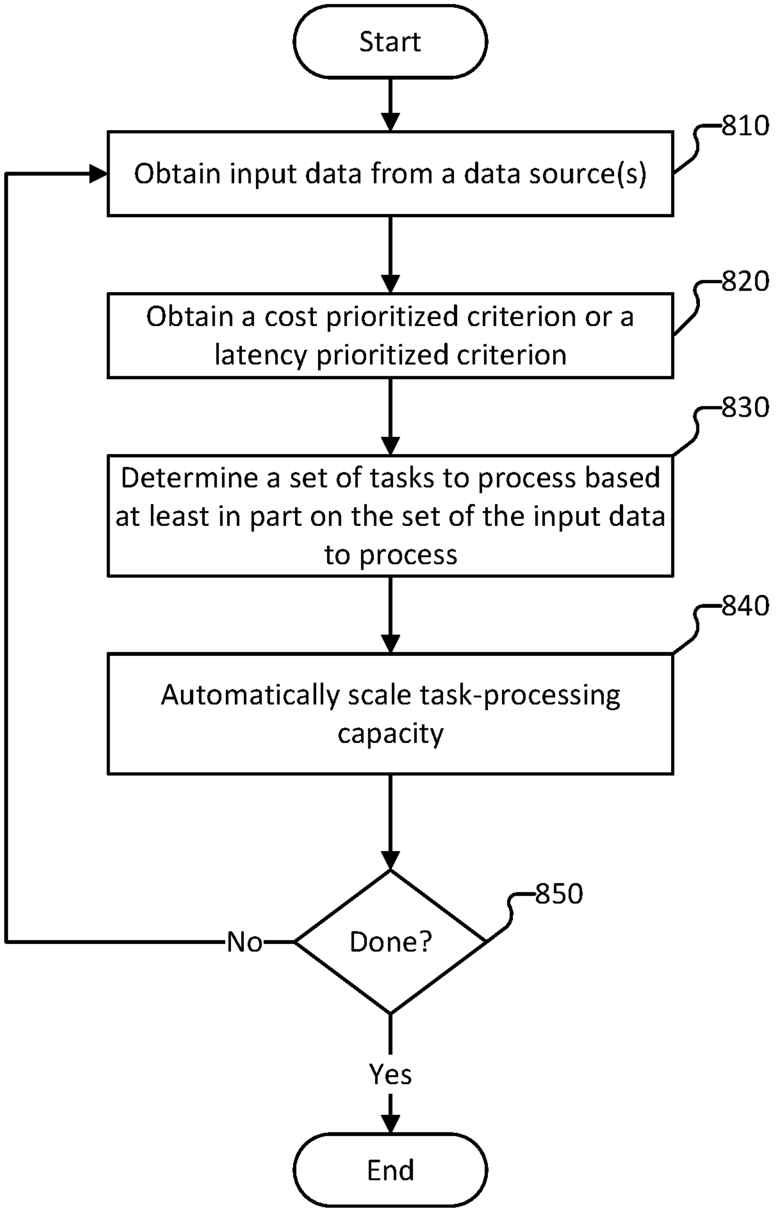
FIG. 8 is a flow diagram of a method for automatically scaling task-processing capacity according to various embodiments of the present application.

FIG. 8 is a flow diagram of a method for automatically scaling task-processing capacity according to various embodiments of the present application. In some embodiments, at least part of process 800 is implemented by system 100 of FIG. 1 or system 200 of FIG. 2.

At 810, input data is obtained from a data source(s). In some embodiments, the system determines a set of input data based on the input data obtained from one or more data sources. For example, the system determines a microbatch of a set of the input data to be processed. In some embodiments, 810 corresponds to, or is similar to, 410 of process 400 of FIG. 4. In some embodiments, 810 corresponds to 410 and 420 of process 400.

At 820, a cost-prioritized criterion or a latency-prioritized criterion is obtained. In some embodiments, the system obtains the cost-prioritized criterion or the latency-prioritized criterion based at least in part on a user input such as to a user interface. For example, the system obtains a preference indication from a user, and the preference indication corresponds to a cost-prioritized criterion or a latency-prioritized criterion. As another example, the system obtains the cost-prioritized criterion or the latency-prioritized criterion from a scaling policy, such as a scaling policy associated with a particular set of data, an organization or user associated with the particular set of data, etc. The obtaining the cost-prioritized criterion or the latency-prioritized criterion can include obtaining a relative priority of latency and/or a relative priority of cost to be implemented in connection with processing the input data. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria. In some embodiments, a weighting between the two criteria is obtained.

Figure 9:
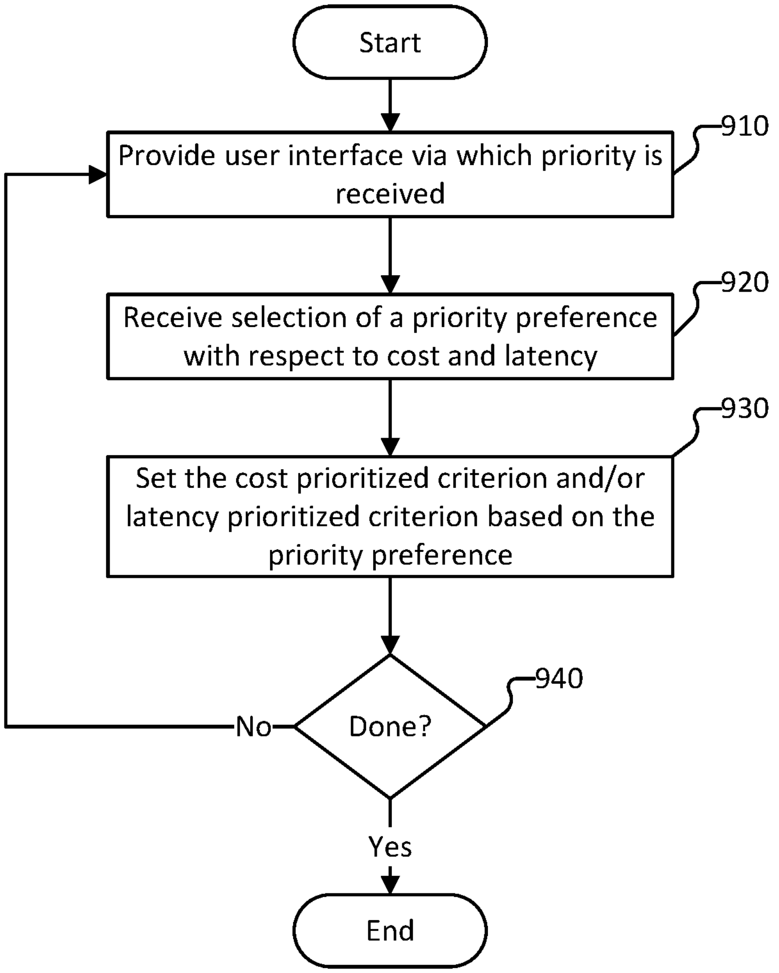
FIG. 9 is a flow diagram of a method for receiving priority preference information pertaining for automatically scaling task-processing capacity according to various embodiments of the present application.

In some embodiments, 820 includes invoking process 900 of FIG. 9.

At 830, a set of tasks to process the based at least in part on the set of input data to process is determined. In some embodiments, 830 corresponds to, or is similar to, 440 of process 400 of FIG. 4.

At 840, the task-processing capacity is automatically scaled. In some embodiments, 840 corresponds to, or is similar to, 450 of process 400 of FIG. 4.

At 850, a determination is made as to whether process 800 is complete. In some embodiments, process 800 is determined to be complete in response to a determination that no further tasks are to be processed, no further input data is obtained or otherwise to be processed, the processing of tasks is paused or stopped, a user has exited the system, an administrator indicates that process 800 is to be paused or stopped, etc. In response to a determination that process 800 is complete, process 800 ends. In response to a determination that process 800 is not complete, process 800 returns to 810.

FIG. 9 is a flow diagram of a method for receiving priority preference information pertaining for automatically scaling task-processing capacity according to various embodiments of the present application. In some embodiments, at least part of process 900 is implemented by system 100 of FIG. 1 or system 200 of FIG. 2. In some embodiments, process 900 is implemented in connection with 820 of process 800 of FIG. 8.

At 910, a user interface via which a priority is received. In some embodiments, the user interface is configured to enable a user to select, or otherwise input, a priority such as a priority of a cost or a latency of processing tasks.

At 920, a selection of a priority preference with respect to cost and latency is received. In some embodiments, the system receives the selection of a priority preference based on an input (e.g., a user input) from a client system or other system associated with a user for whom tasks are being processed.

At 930, the cost-prioritized criterion and/or the latency-prioritized criterion is set based on the priority preference. In some embodiments, the system provides the cost-prioritized criterion and/or the latency-prioritized criterion to a process that performs an autoscaling of task-processing capacity.

At 940, a determination is made as to whether process 900 is complete. In some embodiments, process 900 is determined to be complete in response to a determination that no further tasks are to be processed, or no further changes are to be made to the priority preference, the processing of tasks is paused or stopped, a user has exited the system, an administrator indicates that process 900 is to be paused or stopped, etc. In response to a determination that process 900 is complete, process 900 ends. In response to a determination that process 900 is not complete, process 900 returns to 910.

Figure 10:
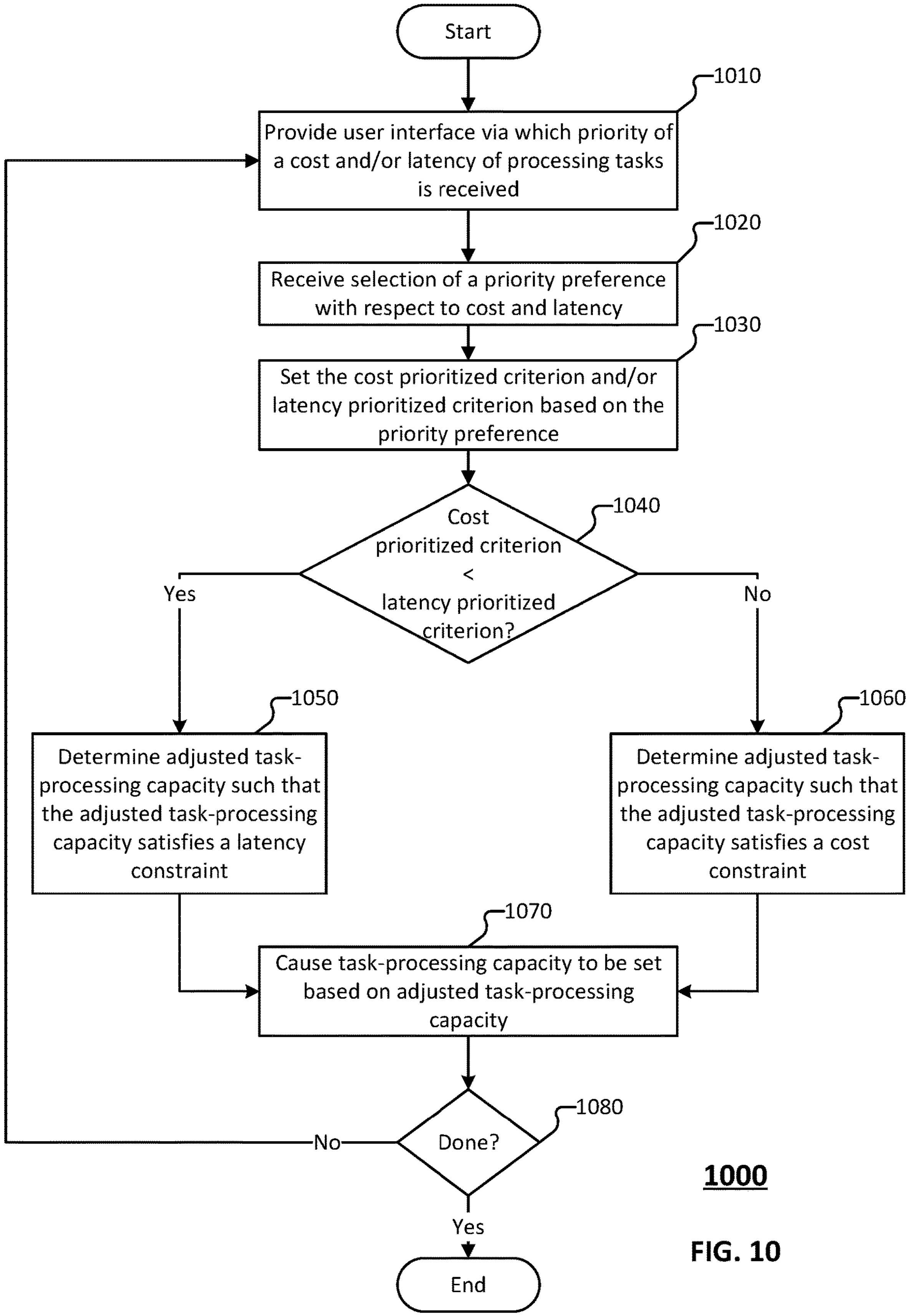
FIG. 10 is a flow diagram of a method for automatically scaling task-processing capacity according to various embodiments of the present application.

FIG. 10 is a flow diagram of a method for automatically scaling task-processing capacity according to various embodiments of the present application. In some embodiments, at least part of process 1000 is implemented by system 100 of FIG. 1 or system 200 of FIG. 2.

At 1010, a user interface via which a priority is received. In some embodiments, the user interface is configured to enable a user to select, or otherwise input, a priority such as a priority of a cost or a latency of processing tasks.

At 1020, a selection of a priority preference with respect to cost and latency is received. In some embodiments, the system receives the selection of a priority preference based on an input (e.g., a user input) from a client system or other system associated with a user for whom tasks are being processed.

At 1030, the cost-prioritized criterion and/or the latency-prioritized criterion is set based at least in part on the priority preference. As an example, the cost-prioritized criterion and/or the latency-prioritized criterion is set in a scaling policy to be used in connection with processing a particular set of input data (e.g., input data from a particular data source, input data for a particular organization or user, etc.).

At 1040, a determination of whether the cost-prioritized criterion is less than the latency-prioritized criterion. In some embodiments, the system compares the cost-prioritized criterion and the latency-prioritized criterion, and the system determines whether the user of user has a preference as to whether the system is to prioritize a latency associated with processing tasks or a cost associated with processing the tasks.

Although the example shown includes a determination whether a cost-prioritized criterion is less than a latency-prioritized criterion, various embodiments can include a determination whether a latency-prioritized criterion is less than a cost-prioritized criterion, or otherwise determine whether the system is to prioritize latency or cost based on the received selection of the priority preference. In various embodiments, the scaling of the task-processing capacity is based at least in part on: cost-prioritized criterion, a latency-prioritized criterion, a cost-prioritized criterion and a latency-prioritized criterion, a weighted amount of the a cost-prioritized criterion, a weighted amount of the a latency-prioritized criterion, a weighted amount of the a cost-prioritized criterion and a weighted amount of the a latency-prioritized criterion, or any other appropriate combination of the criteria. In some embodiments, an automated determination is made as to a weighting of the two criteria achieves an optimal scaling.

In response to a determination that the cost-prioritized criterion is less than the latency-prioritized criterion at 1040, process 1000 proceeds to 1050 at which an adjusted task-processing capacity is determined such that the adjusted task processing capacity satisfies a latency constraint. Thereafter, process 1000 proceeds to 1070.

Conversely, in response to a determination that the cost-prioritized criterion is not less than the latency-prioritized criterion at 1040, process 1000 proceeds to 1060 at which an adjusted task-processing capacity is determined such that the adjusted task processing capacity satisfies a cost constraint. Thereafter, process 1000 proceeds to 1070.

At 1070, the task-processing capacity is caused to be set based at least in part on the adjusted task-processing capacity. In some embodiments, in response to determining the adjusted task-processing capacity, the system causes a task-processing capacity to be modified (e.g., scaled) based on the adjusted task-processing capacity. For example, the system allocates or instantiates (e.g., spins-up) additional task-processing capacity (e.g., the system increases the number of task slots used to process the currently queued tasks) if the adjusted task-processing capacity is indicative of an increase in task-processing resources (e.g., if the adjusted task-processing capacity is greater than a current task-processing capacity). As another example, the system deallocates or spins-down task-processing capacity (e.g., the system decreases the number of task slots used to process the currently queued tasks) if the adjusted task-processing capacity is indicative of a decrease in task-processing resources (e.g., if the adjusted task-processing capacity is less than a current task-processing capacity). In some embodiments, the system modifies the task-processing capacity based at least in part on the adjusted task-processing capacity if the system determines that a difference (e.g., an absolute difference) between the adjusted task-processing capacity and the task-processing capacity exceeds a predefined capacity threshold. As an example, the predefined capacity threshold is defined in a unit of an absolute number of task-processing resources, such as task slots. As another example, the predefined capacity threshold is defined as a percentage difference (e.g., 5%, 10%, 20%, 25%, etc.). Various other units for the predefined capacity threshold can be implemented.

At 1080, a determination is made as to whether process 1000 is complete. In some embodiments, process 1000 is determined to be complete in response to a determination that no further tasks are to be processed, or no further changes are to be made to the priority preference, the processing of tasks is paused or stopped, a user has exited the system, an administrator indicates that process 1000 is to be paused or stopped, etc. In response to a determination that process 1000 is complete, process 1000 ends. In response to a determination that process 1000 is not complete, process 1000 returns to 1010.

Figure 11:
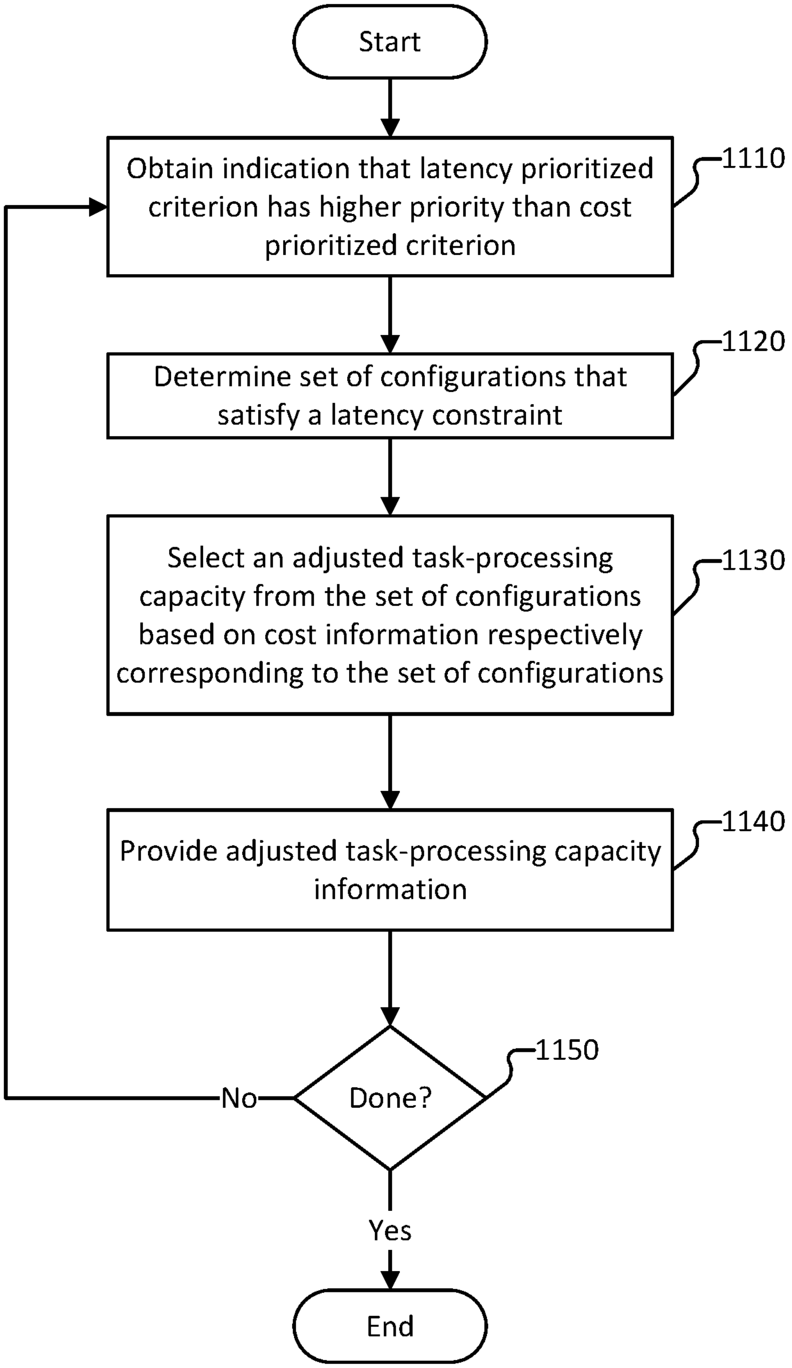
FIG. 11 is a flow diagram of a method for determining an adjusted task-processing capacity according to various embodiments of the present application.

FIG. 11 is a flow diagram of a method for determining an adjusted task-processing capacity according to various embodiments of the present application. In some embodiments, at least part of process 1100 is implemented by system 100 of FIG. 1 or system 200 of FIG. 2.

At 1110, an indication that a latency-prioritized criterion has a higher priority than a cost-prioritized criterion is obtained. As an example, the system obtains a preference indication such as based on a user input (e.g., from a scaling policy that is defined based at least in part on the user input, etc.).

At 1120, a set of configurations that satisfy a latency constraint is determined. In some embodiments, the system determines a set of different configurations of task-processing capacity (e.g., different numbers of task slots, etc.) subject to a latency constraint. The cost latency can be predefined, such as by an administrator or based on one or more predefined scaling policies. In some embodiments, the system determines a set of configurations based at least in part on Equation (1) or Equation (3) described above.

At 1130, an adjusted task-processing capacity is selected from among the set of configurations. In some embodiments, the system selects the adjusted task-processing capacity based at least in part on cost information respectively corresponding to the set of configurations. For example, the system determines an expected latency of processing the set of tasks to be processed for the set of configurations (e.g., for each of the configurations in the set of configurations, the system determines an expected cost to process the current task overhead and any new tasks associated with a new microbatch, etc.). In some embodiments, the system selects the adjusted task-processing capacity based at least in part on Equation (1) or Equation (3) described above.

At 1140, adjusted task-processing capacity information is provided. In some embodiments, the adjusted task-processing capacity information corresponds to an indication indicating the adjusted task-processing capacity. The adjusted task-processing capacity information is provided to the process that performs an autoscaling of task-processing capacity. In some embodiments, the data layer of the system provides information pertaining to the adjusted task-processing capacity to a control layer of the system, such as in connection with a request for the control layer to scale the task-processing capacity (e.g., to scale the worker instances, or clusters of worker instances) in accordance with the adjusted task-processing capacity. The adjusted task-processing capacity information can be stored in an event log that is synced with a control layer of the system, and the event log provides the adjusted task-processing capacity information to the control layer (e.g., a cluster manager process running on the control layer).

At 1150, a determination is made as to whether process 1100 is complete. In some embodiments, process 1100 is determined to be complete in response to a determination that no further tasks are to be processed, the processing of tasks is paused or stopped, a user has exited the system, an administrator indicates that process 1100 is to be paused or stopped, etc. In response to a determination that process 1100 is complete, process 1100 ends. In response to a determination that process 1100 is not complete, process 1100 returns to 1110.

Figure 12:
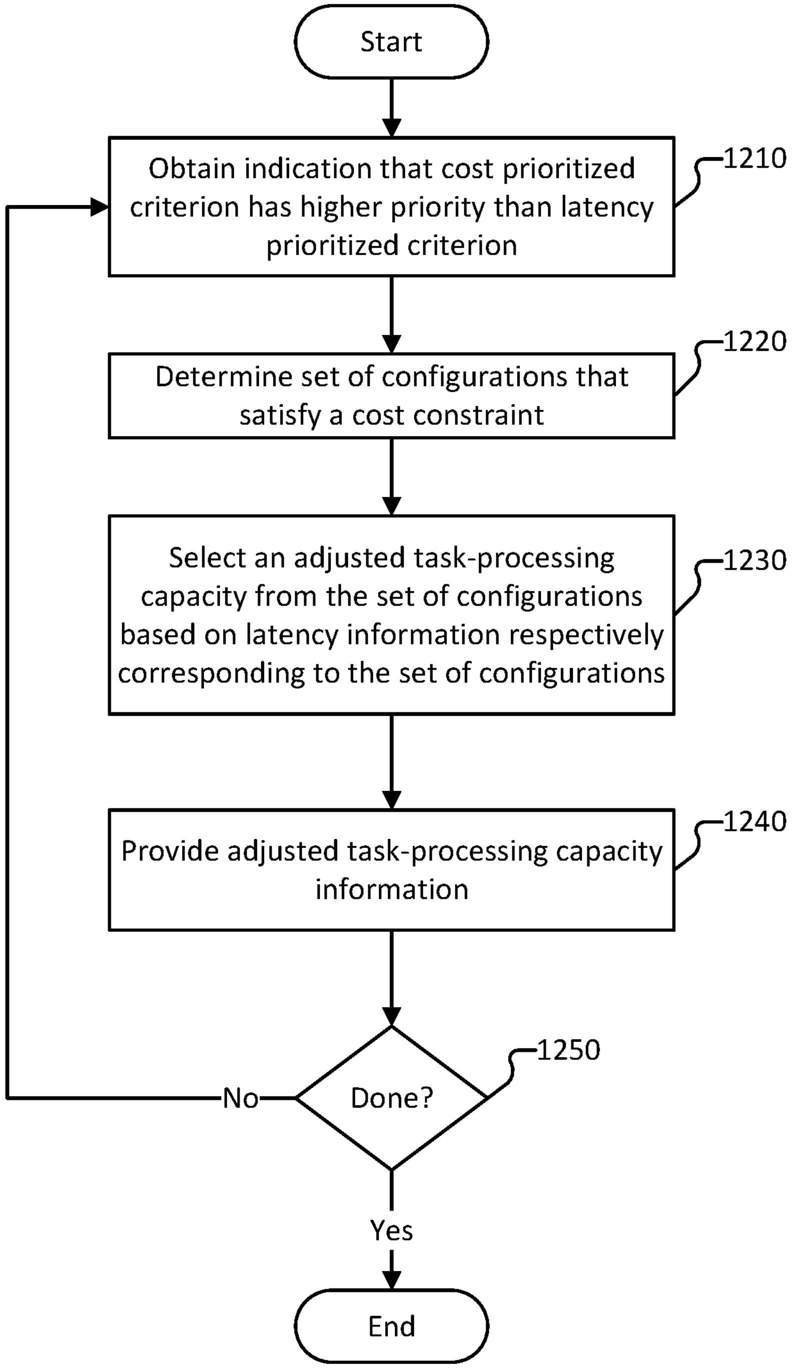
FIG. 12 is a flow diagram of a method for determining an adjusted task-processing capacity according to various embodiments of the present application.

FIG. 12 is a flow diagram of a method for determining an adjusted task-processing capacity according to various embodiments of the present application. In some embodiments, at least part of process 1200 is implemented by system 100 of FIG. 1 or system 200 of FIG. 2.

At 1210, an indication that a cost-prioritized criterion has a higher priority than a latency-prioritized criterion is obtained. As an example, the system obtains a preference indication such as based on a user input (e.g., from a scaling policy that is defined based at least in part on the user input, etc.).

At 1220, a set of configurations that satisfy a cost constraint is determined. In some embodiments, the system determines a set of different configurations of task-processing capacity (e.g., different numbers of task slots, etc.) subject to a cost constraint. The cost constraint can be predefined, such as by an administrator or based on one or more predefined scaling policies. In some embodiments, the system determines a set of configurations based at least in part on Equation (2) or Equation (4) described above.

At 1230, an adjusted task-processing capacity is selected from among the set of configurations. In some embodiments, the system selects the adjusted task-processing capacity based at least in part on latency information respectively corresponding to the set of configurations. For example, the system determines an expected latency of processing the set of tasks to be processed (e.g., for each of the configurations in the set of configurations, the system determines an expected latency to process the current task overhead and any new tasks associated with a new microbatch, etc.). In some embodiments, the system selects the adjusted task-processing capacity based at least in part on Equation (2) or Equation (4) described above.

At 1240, adjusted task-processing capacity information is provided. In some embodiments, the adjusted task-processing capacity information corresponds to an indication indicating the adjusted task-processing capacity. The adjusted task-processing capacity information is provided to the process that performs an autoscaling of task-processing capacity. In some embodiments, the data layer of the system provides information pertaining to the adjusted task-processing capacity to a control layer of the system, such as in connection with a request for the control layer to scale the task-processing capacity (e.g., to scale the worker instances, or clusters of worker instances) in accordance with the adjusted task-processing capacity. The adjusted task-processing capacity information can be stored in an event log that is synced with a control layer of the system, and the event log provides the adjusted task-processing capacity information to the control layer (e.g., a cluster manager process running on the control layer).

At 1250, a determination is made as to whether process 1200 is complete. In some embodiments, process 1200 is determined to be complete in response to a determination that no further tasks are to be processed, the processing of tasks is paused or stopped, a user has exited the system, an administrator indicates that process 1200 is to be paused or stopped, etc. In response to a determination that process 1200 is complete, process 1200 ends. In response to a determination that process 1200 is not complete, process 1200 returns to 1210.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain input data from one or more data sources;

determine, by a data layer comprising one or more clusters of virtual machines, a set of the input data to process;

obtain a current measure of a number of queued tasks and/or a task-processing capacity, wherein the current measure of the number of queued tasks and/or a task-processing capacity are obtained from a data structure that is exposed to the data layer and that is isolated from a control layer, wherein the control layer comprises a cluster manager that manages a set of the one or more clusters, wherein each cluster of the set of one or more clusters comprises a driver node and a set of worker nodes, the driver node and set of worker nodes at the data layer;

determine a set of tasks to process based at least in part on the set of the input data to process, wherein determining the set of tasks further comprises determining whether the input data is bounded, wherein bounded data is batched data and unbounded data is streaming data, and in response to determining that the data is unbounded:

determining a microbatch for the data, and determining the set of tasks to be performed in order to process the microbatch of data; and automatically scale the task-processing capacity based at least in part on (i) the current measure of the number of queued tasks, a measure of the task-processing capacity, and/or a measure of utilization of the task-processing capacity, and (ii) the set of tasks to process; and a memory coupled to the one or more processors and configured to provide the one or more processors with instructions.

2. The system of claim 1, wherein the task-processing capacity corresponds to a number of task-processing slots comprised in the system.

3. The system of claim 2, wherein:

the system further comprises a set of virtual machines; and each virtual machine in a set of virtual machines corresponds to a particular task-processing slot.

4. The system of claim 2, wherein:

the system further comprises a set of central processing unit (CPU) cores; and each virtual machine in a set of virtual machines corresponds to a particular CPU core.

5. The system of claim 1, wherein the current measure of the number of queued tasks and/or a task-processing capacity comprises one or more of: (i) a total number of task-processing slots comprised in the system, and (ii) a number of available task-processing slots.

6. The system of claim 1, wherein the driver node comprises a cluster process being executed, and the current measure of the number of queued tasks and/or a task-processing capacity are exposed to the cluster process.

7. The system of claim 6, wherein the current measure of the number of queued tasks and/or a task-processing capacity exposed to the cluster process comprise information indicating the set of worker nodes, and information indicating particular tasks currently being processed by the set of worker nodes.

8. The system of claim 6, wherein the set of worker nodes respectively comprise an executor process that executes tasks launched by the cluster process running on the driver node.

9. The system of claim 1, wherein automatically scaling the task-processing capacity comprises:

communicating, by the data layer, a modification indication that the task-processing capacity is to be modified, the modification indication being communicated to a cluster manager on a control layer of the system; and in response receiving the modification indication that the task-processing capacity is to be modified, scaling, by the cluster manager, the task-processing capacity.

10. The system of claim 9, wherein scaling the task-processing capacity comprises:

determining, by the control layer, a modification to the task-processing capacity based at least in part on one or more of (i) the indication that the task-processing capacity is to be modified, and (ii) one or more scaling policies; and causing a set of clusters of virtual machines running on the data layer to be modified based on the modification.

11. The system of claim 10, wherein the one or more scaling policies pertain to a quality of service to be satisfied with respect to processing the set of tasks.

12. The system of claim 11, wherein the one or more processors are further configured to: receive one or more user inputs with respect to defining the one or more scaling policies.

13. The system of claim 12, wherein receiving one or more user inputs comprises: providing a user interface via which the one or more scaling policies are defined; receiving a service level indication of one or more of: (i) a latency service level, or (ii) a cost service level; and setting the one or more scaling policies based on the service level indication.

14. The system of claim 13, wherein receiving one or more user inputs comprises:

receiving, from a client system associated with a user, an indication of a priority between a latency service level and a cost service level associated with processing the set of tasks; and setting the one or more scaling policies based on the service level indication.

15. The system of claim 1, wherein automatically scaling the task-processing capacity is based on the set of tasks and agnostic with respect to a data type from which the set of tasks are determined.

16. A method, comprising:

obtaining input data from one or more data sources;

determining, by a data layer comprising one or more clusters of virtual machines, a set of the input data to process;

obtaining a current measure of a number of queued tasks and/or a task-processing capacity, wherein the current measure of the number of queued tasks and/or a task-processing capacity are obtained from a data structure that is exposed to the data layer and that is isolated from a control layer, wherein the control layer comprises a cluster manager that manages a set of the one or more clusters, wherein each cluster of the set of one or more clusters comprises a driver node and a set of worker nodes, the driver node and set of worker nodes at the data layer;

determining a set of tasks to process based at least in part on the set of the input data to process, wherein determining the set of tasks further comprises determining whether the input data is bounded, wherein bounded data is batched data and unbounded data is streaming data, and in response to determining that the data is unbounded:

determining a microbatch for the data, and determining the set of tasks to be performed in order to process the microbatch of data; and automatically scaling the task-processing capacity based at least in part on (i) the current measure of the number of queued tasks, a measure of the task-processing capacity, and/or a measure of utilization of the task-processing capacity, and (ii) the set of tasks to process.

17. A computer program product embodied in a non-transitory computer readable medium and comprising computer instructions for:

obtaining input data from one or more data sources;

determining, by a data layer comprising one or more clusters of virtual machines, a set of the input data to process;

obtaining a current measure of a number of queued tasks and/or a task-processing capacity, wherein the current measure of the number of queued tasks and/or a task-processing capacity are obtained from a data structure that is exposed to the data layer and that is isolated from a control layer, wherein the control layer comprises a cluster manager that manages a set of the one or more clusters, wherein each cluster of the set of one or more clusters comprises a driver node and a set of worker nodes, the driver node and set of worker nodes at the data layer;

determining a set of tasks to process based at least in part on the set of the input data to process, wherein determining the set of tasks further comprises determining whether the input data is bounded, wherein bounded data is batched data and unbounded data is streaming data, and in response to determining that the data is unbounded:

determining a microbatch for the data, and determining the set of tasks to be performed in order to process the microbatch of data; and automatically scaling the task-processing capacity based at least in part on (i) the current measure of the number of queued tasks, a measure of the task-processing capacity, and/or a measure of utilization of the task-processing capacity, and/or the task-processing capacity, and (ii) the set of tasks to process.

* * * * *